(12) United States Patent
Deeter et al.

(10) Patent No.: US 7,517,934 B2
(45) Date of Patent: Apr. 14, 2009

(54) MODIFIED ANIONICALLY POLYMERIZED POLYMERS

(75) Inventors: Gary A. Deeter, Racine, WI (US);
Marco A. Villalobos, Lindenhurst, IL (US); Sergio Alberto Moctezuma Espiricueto, Tamaulipas (MX); Javier Revilla Vazquez, Estado de Mexico (MX); Jose Manuel Rojas Garcia, Delegacion Benito Juarez (MX); Gerardo Gutierrez Cruz, Estado de Mexico (MX)

(73) Assignees: BASF Corporation, Florham Park, NJ (US); Dynasol, LLC., Houston, TX (US)

( * ) Notice: Subject to any disclaimer, the term of this patent is extended or adjusted under 35 U.S.C. 154(b) by 64 days.

(21) Appl. No.: 10/710,654

(22) Filed: Jul. 27, 2004

(65) Prior Publication Data

US 2005/0027071 A1 Feb. 3, 2005

Related U.S. Application Data

(60) Provisional application No. 60/481,164, filed on Jul. 31, 2003.

(51) Int. Cl.
*C08G 81/00* (2006.01)
*C08L 95/00* (2006.01)

(52) U.S. Cl. .............. 525/63; 525/64; 525/65; 525/66; 525/67; 525/68; 525/69; 525/88; 525/271

(58) Field of Classification Search .............. 525/271, 525/63, 64, 65, 66, 67, 68, 69, 88
See application file for complete search history.

(56) References Cited

U.S. PATENT DOCUMENTS

| | | | | |
|---|---|---|---|---|
| 2,324,483 A * | 7/1943 | Castan | ............... | 528/112 |
| 2,444,333 A * | 6/1948 | Castan | ............... | 528/95 |
| 3,281,383 A | 10/1966 | Zelinski et al. | ............. | 260/23.7 |
| 3,637,554 A | 1/1972 | Childers et al. | ............. | 260/23.7 |
| 3,753,936 A | 8/1973 | Marrs et al. | ............... | 260/27 |
| 4,075,186 A | 2/1978 | Ambrose et al. | ............. | 260/887 |
| 4,096,203 A | 6/1978 | St. Clair | ............... | 260/876 |
| 4,100,336 A * | 7/1978 | Yax et al. | ............... | 526/67 |
| 4,120,839 A * | 10/1978 | Emmons et al. | ............. | 524/354 |
| 4,129,541 A | 12/1978 | Marrs et al. | ............... | 260/28.5 |
| 4,371,670 A | 2/1983 | Bi | ............... | 525/342 |
| 4,430,465 A | 2/1984 | Abbott | ............... | 524/64 |
| 4,465,811 A | 8/1984 | Mehalla | ............... | 525/249 |
| 4,492,781 A | 1/1985 | Duszak et al. | ............... | 524/59 |
| 4,503,188 A | 3/1985 | Mancinelli | ............... | 525/98 |
| 4,526,927 A | 7/1985 | Hambrecht et al. | ............. | 525/68 |
| 4,544,690 A | 10/1985 | Ladish | ............... | 524/60 |
| 4,637,946 A | 1/1987 | Shah et al. | ............... | 428/63 |
| 4,755,545 A | 7/1988 | Lalwani | ............... | 524/64 |
| 5,094,930 A | 3/1992 | Nomori et al. | ............... | 430/96 |
| 5,104,921 A | 4/1992 | Erickson et al. | | |
| 5,246,986 A | 9/1993 | Pierre et al. | ............... | 524/68 |
| 5,328,943 A | 7/1994 | Isobe et al. | ............... | 524/70 |
| 5,336,705 A | 8/1994 | Gorbaty et al. | ............... | 524/68 |
| 5,397,841 A | 3/1995 | DuBois et al. | ............... | 525/227 |
| 5,436,285 A | 7/1995 | Causyn et al. | ............... | 524/68 |
| 5,548,023 A * | 8/1996 | Powers et al. | ............... | 525/69 |
| 5,549,744 A | 8/1996 | Puzik et al. | ............... | 106/274 |
| 5,703,148 A | 12/1997 | Jolivet et al. | ............... | 524/62 |
| 5,711,796 A | 1/1998 | Grzybowski et al. | ...... | 106/281.1 |
| 5,749,953 A | 5/1998 | Doyle | ............... | 106/273.1 |
| 5,883,162 A | 3/1999 | Planche et al. | ............. | 524/68 |
| 5,904,760 A | 5/1999 | Hayner | ............... | 106/279 |
| 5,990,203 A | 11/1999 | Cheng et al. | ............... | 523/450 |
| 5,998,544 A | 12/1999 | Engelhardt et al. | .......... | 525/92 |
| 6,057,390 A | 5/2000 | Loza et al. | ............... | 524/68 |
| 6,087,420 A | 7/2000 | Planche et al. | ............. | 524/68 |
| 6,136,899 A | 10/2000 | Lewandowski et al. | ........ | 524/71 |
| 6,143,820 A * | 11/2000 | Klier et al. | ............... | 524/556 |
| 6,248,396 B1 | 6/2001 | Helf | ............... | 427/138 |
| 6,362,257 B1 | 3/2002 | Chehovits et al. | ............. | 524/59 |
| 6,380,284 B1 | 4/2002 | Lopez | ............... | 524/59 |
| 6,403,714 B1 | 6/2002 | Wang et al. | ............... | 525/143 |
| 6,414,056 B1 | 7/2002 | Puzic et al. | ............... | 524/59 |
| 2003/0069363 A1* | 4/2003 | Greenblatt et al. | .......... | 525/274 |
| 2003/0187138 A1* | 10/2003 | Lai et al. | ............... | 525/115 |
| 2003/0191262 A1* | 10/2003 | McCormick et al. | ........ | 526/288 |
| 2006/0111532 A1* | 5/2006 | McCormick et al. | ..... | 526/303.1 |

FOREIGN PATENT DOCUMENTS

| | | |
|---|---|---|
| DE | 2 104 079 | 10/1972 |
| DE | 3516070 A1 | 6/1986 |
| EP | 0201787 A2 | 4/1986 |

(Continued)

OTHER PUBLICATIONS

Taubitz, CAPLUS AN 1987:85288, abstracting EP 201787, Nov. 1986.*

(Continued)

*Primary Examiner*—Jeffrey C Mullis
(74) *Attorney, Agent, or Firm*—Foley & Lardner LLP

(57) ABSTRACT

Oligomer-modified anionically polymerized polymers, reinforced materials made with the polymers and articles made from the reinforced materials are provided. The oligomer-modified polymers are made by reacting anionically polymerized polymers with low molecular weight acrylic oligomers. The oligomer-modified polymers may be used as adhesives, compatibilizers, reinforcing agents and impact modifiers.

73 Claims, 6 Drawing Sheets

FOREIGN PATENT DOCUMENTS

| | | |
|---|---|---|
| EP | 0210787 A3 | 4/1986 |
| EP | 0 201 787 A2 | 11/1986 |
| EP | 0 509 357 A1 | 10/1992 |
| EP | 0 634 420 A1 | 1/1995 |
| EP | 0 995 341 A2 | 11/1999 |
| GB | 1 233 780 | 5/1971 |
| JP | 1997302171 A | 11/1997 |
| WO | WO 98/44046 | 10/1998 |
| WO | WO 01/18122 A1 | 3/2001 |
| WO | WO 02/20661 A1 | 3/2002 |
| WO | WO 02/34835 A1 | 5/2002 |
| WO | WO 02/50188 A1 | 6/2002 |

OTHER PUBLICATIONS

Brandstetter et al., translation of DE 3150171, Jun. 1983.*
Data supplied from esp@cenet database-Worldwide, English Abstract for EP0201787, filed Nov. 20, 1986, Taubitz, Christof, Dr.

* cited by examiner

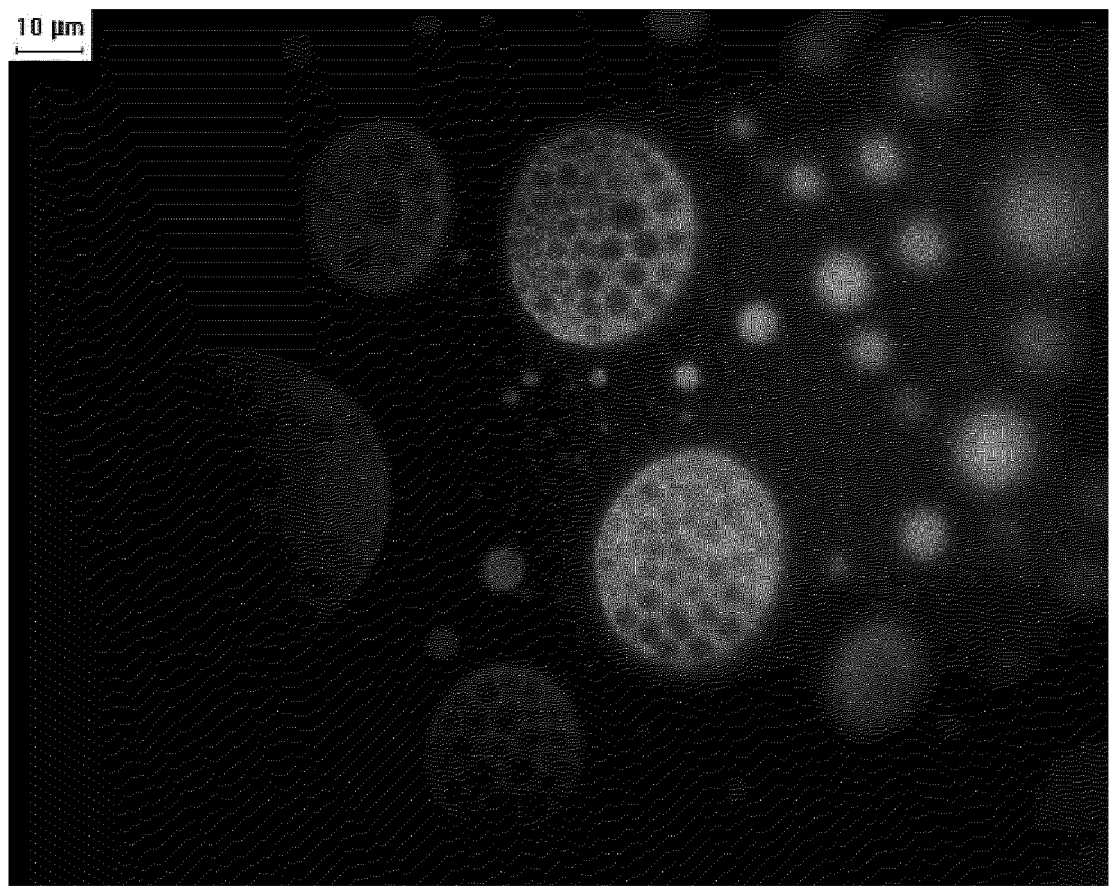
Fig. 3. Polymer-modified asphalt. 3.5 wt. % APP-1 / AC-20

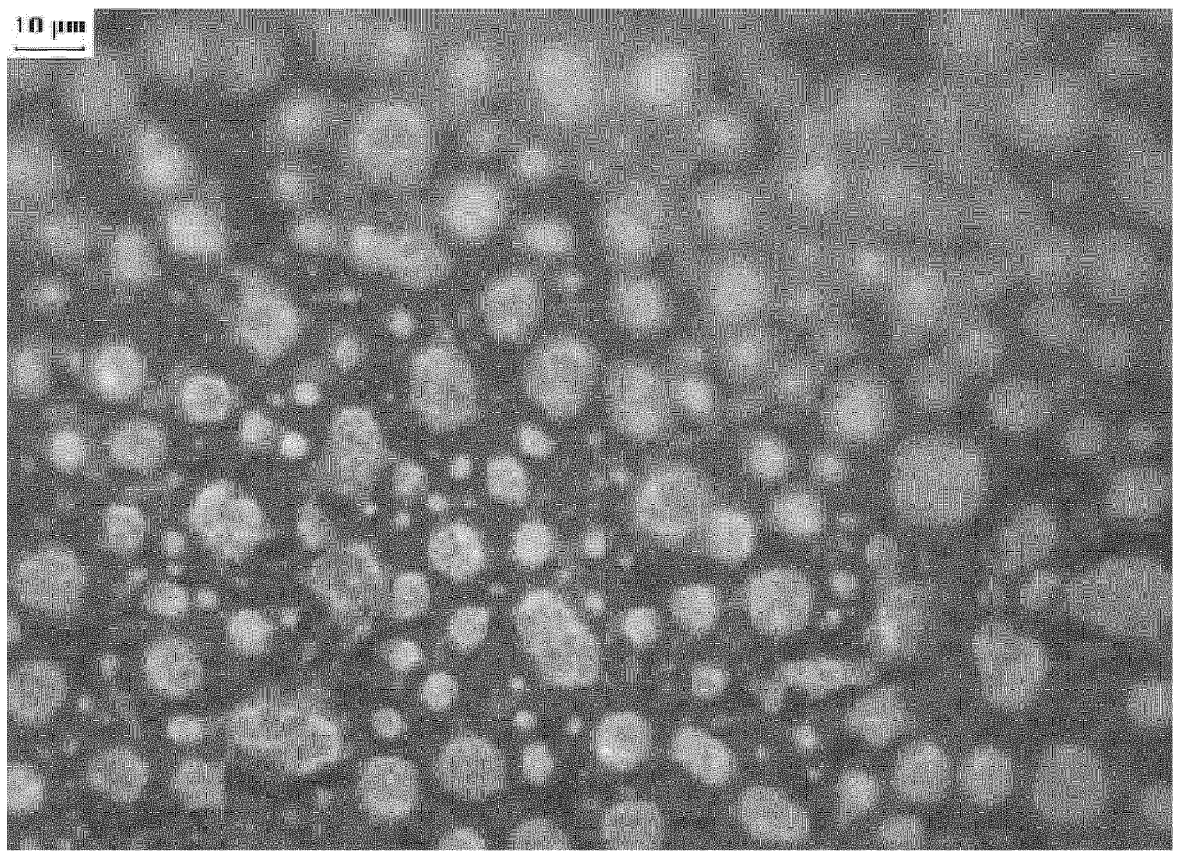
Fig. 4. Polymer-modified asphalt. 3.5 wt. % OMAPP-3 / AC-20

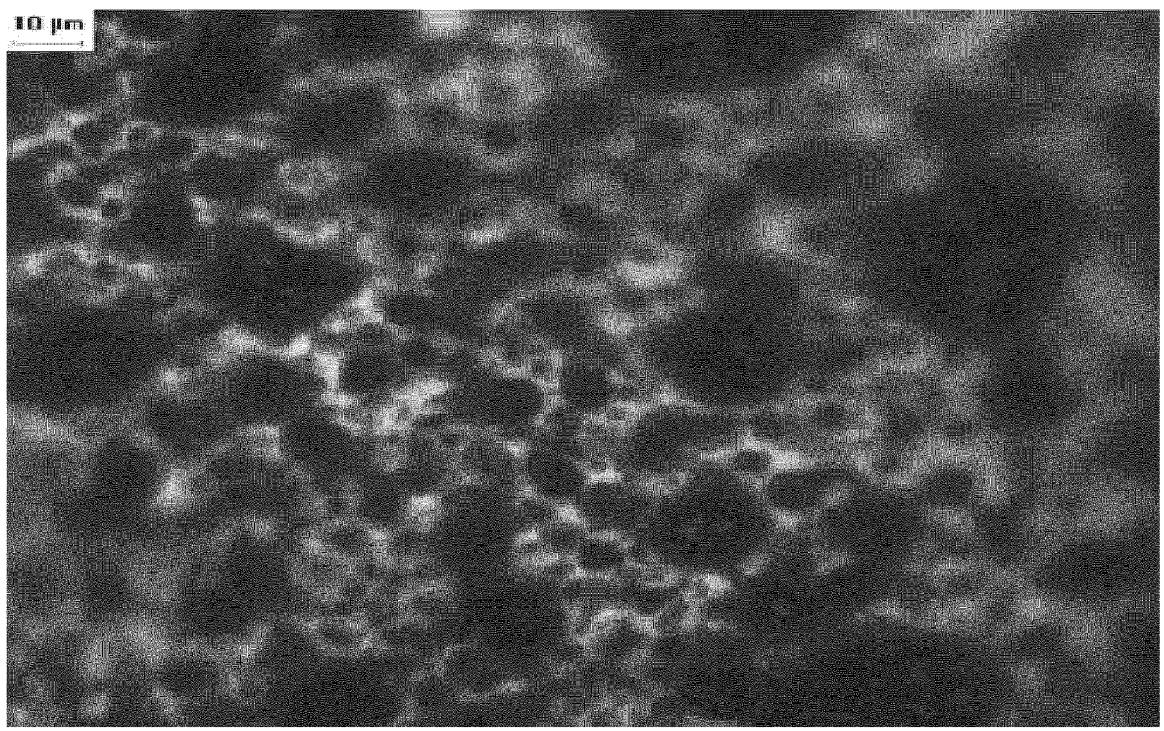
Fig. 5. Polymer-modified asphalt. 11 wt. % APP-1 / AC-20

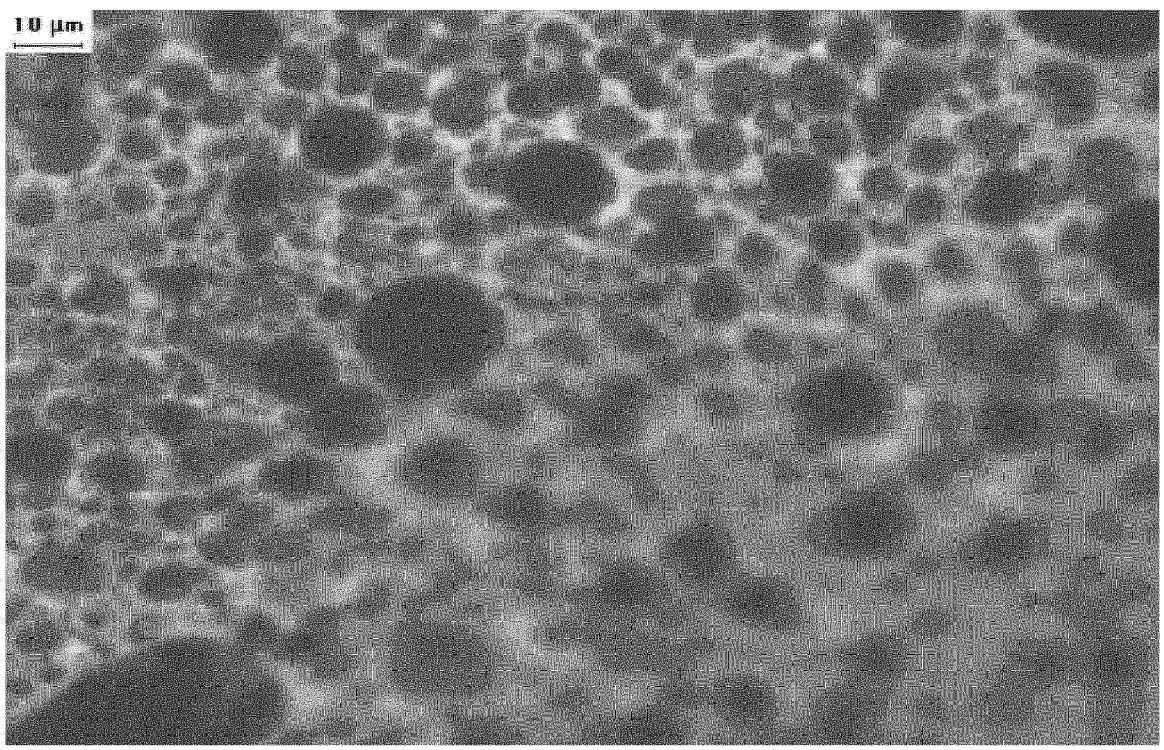
Fig. 6. Polymer-modified asphalt. 11 wt. % OMAPP-3 / AC-20

MODIFIED ANIONICALLY POLYMERIZED POLYMERS

BACKGROUND OF INVENTION

Field of the Invention

The invention relates to functionally modified anionically polymerized polymers, reinforced materials containing the polymers, and articles made from the reinforced materials.

Anionic polymerization is a well-known technique for manufacturing plastics and elastomers. Due to the "living" character of the polymer chains during the anionic polymerization process, anionic polymerization allows for the production of polymers having well-defined polymer blocks and narrow molecular weight distributions. Anionic polymerization has long been used to polymerize conjugated diolefins such as butadiene and isoprene and to copolymerize such diolefins with other anionically polymerizable monomers, such as vinyl aromatics and substituted vinyl aromatics. Commercial polymers commonly made through the anionic polymerization process include plastics such as polystyrene, elastomers such as polybutadiene and polyisoprene, and thermoplastic elastomers such as block copolymers of styrene, butadiene and isoprene with varying sizes and numbers of blocks.

Many commercial applications for anionically polymerized polymers may be found in the literature. The anionically polymerized polymers may be useful in their own right as elastomers for tires and other industries, adhesives, sealants and coatings. In addition anionically polymerized polymers may be used to modify the characteristics of various materials such as plastics and rubbers. For example, the anionically polymerized polymers may be used as compatibilizers and reinforcing agents in asphalt and compatibilizers or tie layers in polymer blends. Anionically polymerized polymers may be used as impact modifiers, reinforcing agents or viscosity modifiers in plastics used to manufacture molded and extruded goods such as injection molded parts and engineering components, films and fibers.

Anionically polymerized polymers may be functionally modified in order to improve their characteristics for their intended applications. Many modification routes have been developed over the years. The most common anionically polymerized polymer modifications include introducing chemical functionalities through end-capping reactions; chain coupling through reactions of multifunctional species with living anions to convert the polymers from linear structures to radial, comb or arm-like structures; hydrogenation of residual double bonds; and combinations of the above modifications. The end-capping reactions and chain coupling reactions may be carried out using either small molecules or high molecular weight polymers as reactants. Examples of small molecules typically used as capping or coupling agents in conventional anionically polymerized polymer modification techniques include di- or polyfunctional compounds such as divinyl benzenes, diisopropenyl benzenes, trivinyl benzenes, divinyl naphthalenes, trivinyl naphthalenes, tin tetrachloride and various silane compounds. Examples of typical high molecular weight polymers used as end-capping and coupling agents in the modification of anionically polymerized polymers include polyolefins and halogenated styrene-based polymers. Many of these modification techniques have become routine practice and the modified products produced using these modification techniques are of commercial importance.

However, many problems remain in the area of anionic polymer modification. These problems are related to the inability of modified or unmodified anionically polymerized polymers to perform in different applications due to a lack of compatibility, miscibility, adhesion or dispersibility in or with other materials when the anionically polymerized polymers are included in a physical or reactive blend. For example, many styrene/butadiene-based and styrene/isoprene-based polymers are insufficiently compatible with polar plastics, such as polyamides, polyurethanes, polyethers, polysulfones, polyether-ketones, polyetherether ketones, polyimides, polyetherimides polycarbonates and polyesters, to be suitable in applications using these plastics. Unfortunately, current modifications of anionically polymerized polymers, which introduce polar or chemical groups into the polymers, have not been successful in resolving these limitations.

Another important application where currently available anionically polymerized polymers have met with limited success is in the reinforcement of asphalt for paving and roofing applications. Although styrene/butadiene- and styrene/isoprene-based polymers, both linear and nonlinear, are widely used in reinforcing asphalt, problems related to the dispersibility of the anionically polymerized polymers in the asphalt and to the morphology stability of the resulting asphalt formulations ultimately have a negative effect on the long-term performance of the asphalt. Similar problems have arisen in applications where anionically polymerized polymers are used as pressure sensitive adhesives and hot melt adhesives and when the anionically polymerized polymers are used as impact modifiers in plastics for (co)extrusion or (co)injection molding applications. Additional problems remain when anionically polymerized polymers are used as elastomers for tires showing poor adhesion to other tire components such as metals and fillers.

Thus, a need exists for a method of modifying anionically polymerized polymers to produce modified anionically polymerized polymers that are compatible with a wide variety of rubber and plastic materials and other substrates and suitable for a broad range of applications.

SUMMARY OF INVENTION

Oligomer-modified anionically polymerized polymers, polymer blends and mixtures containing the polymers, methods for producing the polymers, reinforced materials containing the polymers and articles made from the reinforced materials are provided.

One aspect of the invention provides a modified anionically polymerized polymer made from the reaction product of an anionically polymerized polymer and an oligomer made from at least one acrylic monomer and functionalized with at least one functional group selected from esters, carboxylic acids, anhydrides and epoxies.

Another aspect of the invention provides a method for preparing a modified anionically polymerized polymer that includes the step of reacting an anionically polymerized polymer with an oligomer made from at least one acrylic monomer and functionalized with at least one functional group selected from esters, carboxylic acids, anhydrides and epoxies.

Also provided are compositions composed of mixtures of the oligomer-modified anionically polymerized polymers with non-modified anionically polymerized polymers and/or anionically polymerized polymers that have been modified with capping or coupling agents, other than the oligomers provided herein. For the purposes of this disclosure, a non-modified anionically polymerized polymer refers to anionically polymerized polymers that have undergone anionic polymerization termination reactions rather than end-capping or coupling reactions with other molecules. The nature and ratios of each of these components in a mixture may be selected to provide the appropriate properties for a given application.

Other aspects of the invention provide articles and compositions made from the oligomer-modified anionically polymerized polymers, reinforced materials made from a mixture of the oligomer-modified anionically polymerized polymers with a material to be reinforced and articles made from the reinforced materials. Other aspects of the invention provide oligomer-modified anionically polymerized polymers with enhanced adhesion to specific substrates and articles made from the adhesion enhanced materials.

The oligomers used to functionally modify the anionically polymerized polymers are characterized by low molecular weights. Throughout this disclosure, the molecular weights cited are measured using gel permeation chromatography under ASTM D 3536 with a linear polystyrene standard. For example, in some instances the oligomers have a number average molecular weight (Mn) of no more than about 10,000 and a weight average molecular weight (Mw) of no more than about 60,000. In some instances, the oligomers have a weight average molecular weight of no more than about 40,000. This includes oligomers having a number average molecular weight of about 1,000 to about 10,000 and oligomers having a weight average molecular weight of about 1,500 to about 40,000. However, the oligomers are significantly larger than small molecules which have been used to modify anionically polymerized polymers. Typically, the oligomers have a number average molecular weight of at least about 500, desirably at least about 1000 and a weight average molecular weight of at least 1000, desirably at least about 1500.

The oligomers are made from at least one acrylic monomer and are functionalized with at least one functional group which is selected from esters, carboxylic acids, anhydrides and epoxies. In addition to the acrylic monomer, the oligomers may be made from at least one additional free radically-polymerizable monomer such as, but not limited to, styrene or modified styrene monomers.

By controlling the comonomer composition, the molecular weight distribution, and the functionality type and distribution in the oligomers, the chemical and physical characteristics of the oligomers can be tailored to provide an oligomer-modified anionically polymerized polymer having suitable qualities to provide appropriate miscibility, dispersibility, compatibility and/or adhesion characteristics for a desired application. Particular applications for which the oligomer-modified anionically polymerized polymers of the present invention are well suited include asphalt reinforcers, modifiers and asphalt morphology stabilizers. Other suitable applications include use as compatibilizers, viscosity modifiers, flow modifiers, process aids, rheology control agents, and impact modifiers for polar plastics and polar plastics blends and alloys, and composites. The oligomer-modified anionically polymerized polymers may also be designed with tailored surface activities to provide adhesives with optimal adhesion to polar substrates, useful in typical adhesive applications but also on tire rubbers with enhanced metal adhesion.

BRIEF DESCRIPTION OF DRAWINGS

FIG. 3 is a fluorescence micrograph of a polymer-modified asphalt made from 3.5 wt. % APP-1 in AC-20, as described in Example 2.

FIG. 4 is a fluorescence micrograph of a polymer-modified asphalt made from 3.5 wt. % OMAPP-3 in AC-20, as described in Example 2.

FIG. 5 is a fluorescence micrograph of a polymer-modified asphalt made from 11 wt. % APP-1 in AC-20, as described in Example 3.

FIG. 6 is a fluorescence micrograph of a polymer-modified asphalt made from 11 wt. % OMAPP-3 in AC-20, as described in Example 3.

DETAILED DESCRIPTION

Figure 1:
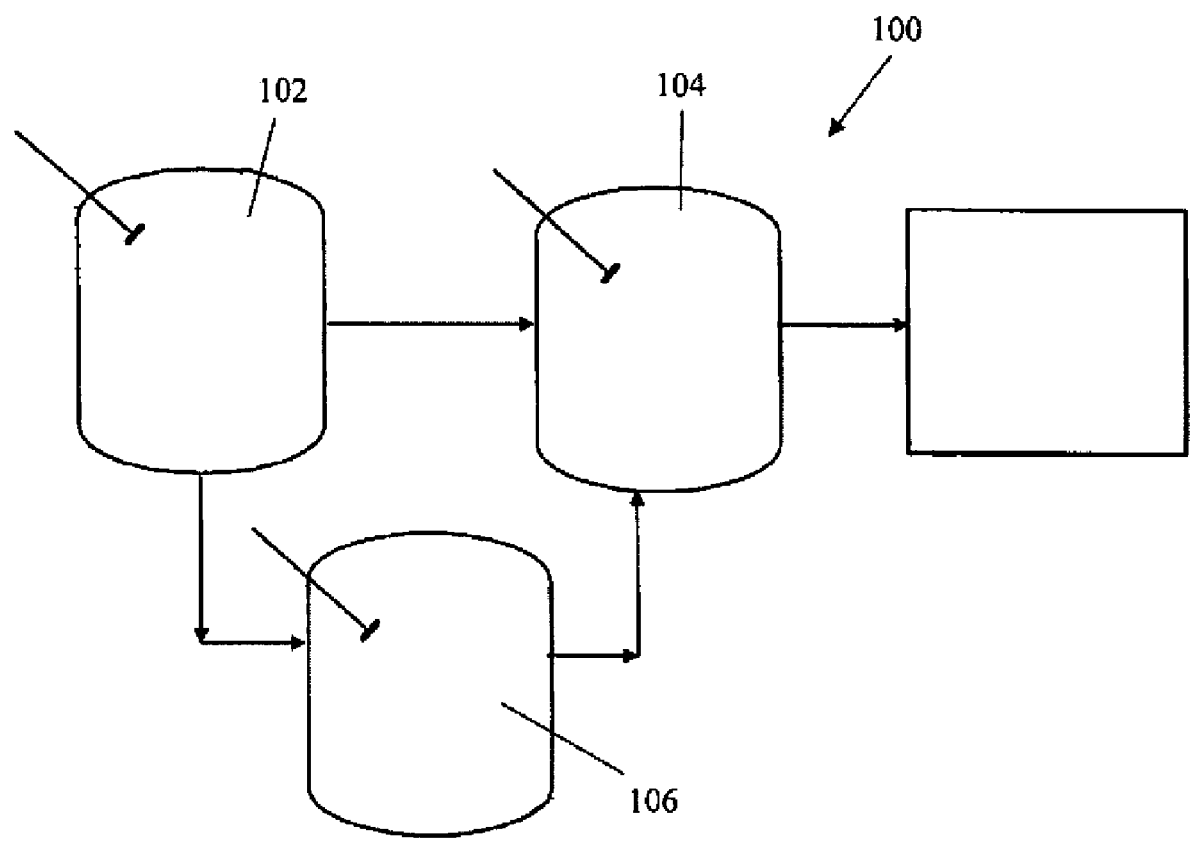
FIG. 1 is a schematic diagram of a first reactor apparatus that may be used to produce oligomer-modified anionically polymerized polymers.

The present invention provides oligomer-modified anionically polymerized polymers, methods for producing the polymers, compositions and articles made from the polymers, reinforced materials containing the polymers and articles made from the reinforced materials.

The oligomer-modified anionically polymerized polymers of the present invention are produced by reacting oligomers with anionically polymerized polymers to produce modified polymers having tailored chemical and physical properties that make them suitable for use in a broad range of commercial applications. In particular, some of the oligomer-modified anionically polymerized polymers provided herein are well suited for use as adhesives, including pressure sensitive adhesives and hot melt adhesives. The oligomer-modified anionically polymerized polymers may also be designed for use as compatibilizing or reinforcing agents in asphalt and in polymer blends. Asphalts which may benefit from the compatibilizing or reinforcing agents provided herein include those commonly used for road paving and roofing applications. Roofing applications include reinforcement of roof shingles, as well as modification of materials for roof waterproofing, repair, and maintenance. Certain types of oligomer-modified anionically polymerized polymers may also be used as reinforcing agents, viscosity modifiers, flow modifiers, processing aids and impact modifiers in rubbers and plastics. Polar plastics and polar engineering plastics are types of plastic that may benefit from the oligomer-modified anionically polymerized polymers. Polar plastics include, but are not limited to polyamides, polyurethanes, polyethers, polysulfones, polyether-ketones, polyetherether ketones, polyimides, polyetherimides polycarbonates and polyesters.

By controlling oligomer characteristics, including comonomer composition, molecular weight distribution and type and degree of functionalization, oligomer properties such as solubility parameters, refractive indices, glass transition temperatures, and surface activities may be tailored to provide oligomers suited for a desired application. As a result, anionically polymerized polymers may be modified with the oligomers to provide oligomer-modified anionically polymerized polymers having carefully tailored characteristics. Thus, for a desired application, an oligomer-modified anionically polymerized polymer may be designed such that it has the appropriate adhesive properties or is appropriately compatible, miscible or dispersible with or in other materials.

The anionically polymerized polymers to be modified according to the present invention may be any anionically polymerized polymers capable of undergoing end-capping or coupling reactions with the oligomers. Anionic polymerization is a well-known technique which uses initiators, such as organo alkali metal initiators, to polymerize conjugated diolefins or other anionically polymerizable monomers or to copolymerize conjugated diolefins with other anionically polymerizable monomers. Anionic polymerization may be carried out in a continuous, batch or semi-batch process. A general description of the anionic polymerization process may be found in *Polymer Chemistry, An Introduction*; Chapter 7, pages 250-261, 2 $^{nd}$ Ed., M. P. Stevens editor (1990), which is incorporated herein by reference. The polymers produced by anionic polymerization are commonly referred to as "living polymers" because each monomer reaction step creates a new reactive carbanion, allowing the polymer to continue to grow until the monomers are depleted. The polymers remain "alive" even after the monomers are depleted and will continue to react and grow once additional reactive monomer is supplied. Thus, anionic polymerization is a particularly attractive process for the production of well-defined block copolymers. The anionically polymerized polymers may be either radial, linear or branched polymers depending upon the functionalities of the initiators, monomers or coupling agents used to make them.

Anionic polymerization is typically carried out in inert hydrocarbon solvents at low temperatures under vacuum or an inert atmosphere with highly purified reagents in order to prevent the premature termination of the polymerization reaction. Anionically polymerized polymers include thermoplastic, elastomeric, and thermoplastic-elastomer polymers. The polymers may be homopolymers or copolymers including both random and block copolymers. The anionically polymerized polymers for use in the present invention typically have a number average molecular weight from about 3,000 to about 300,000. This includes anionically polymerized polymers having a number average molecular weight from about 20,000 to 300,000 although the invention is not limited to anionically polymerized polymers falling within these molecular weight ranges.

Suitable conjugated diolefins for use in building the anionically polymerizable polymers for use in the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 3,4-dimethyl-1,3-hexadiene, 1,3-octadiene, 4,5-diethyl-1,3-octadiene and the like. Other anionically polymerizable monomers that may be used in the production of the anionically polymerizable polymers include, but are not limited to, vinylaromatic monomers, such as styrene and styrene derivatives including 3-methylstyrene, α-methylstyrene, p-methylstyrene, α,4-dimethylstyrene, t-butylstyrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene. Other anionically polymerizable monomers include acrylamides, acrylonitriles, nitrobutene, vinylisocyanates, anhydrides, methacrylates, acrylates, vinyl pyridines, carbodiimides, lactones, lactams, dienes, cyclic siloxanes, and ethylene.

Examples of anionically polymerized polymers that may be made from anionically polymerizable monomers include, but are not limited to, polystyrene, polybutadiene, polyisoprene, polyethers, polyacetals, and polyphenylene oxides. The anionically polymerizable polymers may also be elastomers and thermoplastic elastomers made from block copolymers of styrene (S), butadiene (B), ethylene(E) and isoprene (I) of varying sizes and number of blocks. Examples of such elastomers and thermoplastic elastomers include SB, SI, SBR, (SB)$_m$S (where m is an interger), SBS, SIS, BSB, ISI block copolymers as well as their hydrogenated and partially hydrogenated counterparts, including SEBS, SEB and others.

By way of illustration, examples of anionically polymerized polymers that are well-suited for use as modifiers asphalts and adhesives include linear elastomers produced by the copolymerization of at least one vinyl aromatic monomer and at least one conjugated diene monomer. Some such linear elastomers are copolymers that may be characterized by the following structures, depending on the order of addition of monomers and monomer reactivity:

$AB(A_kB_j)_i$

$BA(B_jA_k)_i$ where A is a block homopolymer or a random or tapered copolymer predominantly composed of polymerized vinylaromatic compounds and B is a block homopolymer or a random or tapered copolymer predominantly composed of polymerized conjugated diene compounds. In the structures above, i is zero or a positive whole number 1 or higher, and j and k may be independently either zero or one. This means that the A and B segments present in the vinylaromatic/conjugated diene polymer can form diblocks, triblocks, and multiblocks. In the case of triblock and multiblock polymers, the length and composition of the A and B homopolymers or copolymers can be different within the same polymer. For example, in an ABA polymer, the two A blocks can have a different size and composition.

In some embodiments of the linear elastomers, the molar ratio of vinyl aromatic monomer to conjugated diene monomer desirably ranges from about 0.1 to about 1.0, desirably, from about 0.2 to about 0.5 and more desirably about 0.3 to 0.4. The vinyl group content of the linear elastomer based on the conjugated diene incorporated therein may range desirably from about 8 to about 70 mole %, and more desirably, from about 8 to about 55 mole %.

Many anionic polymerization initiators are well known and commercially available. Organo lithium compounds, such as butyl lithium, are examples of commonly used initiators. Specific examples of these initiators include methyllithium, ethyllithium, t-butyllithium, n-butyllithium, n-decyllithium, isopropyllithium, eicosyllithium, cylcloalkyllithium compounds, such as cyclohexyllithium, and aryllithium compounds, such as phenyllithium, naphthllithium, p-toluyllithium, and the like.

The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone and methyl ethyl ketone. Cyclohexane and nin particular, are well suited for use as the solvents in anionic polymerizations.

The oligomers used to modify the anionically polymerized polymers are made from free-radically polymerizable monomers. The oligomers are functionalized with at least one functional group selected from esters, carboxylic acids, anhydrides and epoxies, which may be located on one of the polymerizable monomers. The monomers useful in this invention include acrylic and non-acrylic monomers. Suitable non-acrylic monomers include aromatic monomers, olefins, unsaturated dicarboxylic anhydrides, acrylonitrile, and the like. An acrylic monomer having only a methacrylate or acrylate group (i.e., a nonfunctional acrylate or methacrylate) is considered an ester-functional monomer for the purposes of this disclosure. Thus, the oligomers may be multifunctional oligomers comprising at least two, and in some instances at least three or more, functionalities. Preferred ratios of acrylic to non-acrylic monomers depend on the desired properties of the oligomer, such as solubility parameter, refractive index, glass transition temperature, and surface activity. The desired properties will, in turn, depend on the intended application of the modified anionically polymerized polymer.

The extent of oligomer functionalization may be measured as number average (Fn) and weight average (Fw) number of functional groups per chain. Optimal Fn and Fw values for a given oligomer will depend on the intended application. In some embodiments, the oligomers have an Fn value of no more than about 20. This includes embodiments where the oligomers have an Fn value of no more than about 10 and further includes embodiments where the oligomers have an Fn value of no more than about 1. For example, some of the oligomers provided herein have an Fn value ranging from about 1 to 20, desirably about 1 to 10. Similarly, in some embodiments, the oligomers have an Fw value of no more than about 100. This includes embodiments where the oligomers have an Fw value of no more than about 20 and further includes embodiments where the oligomers have an Fw value of no more than about 1. For example, some of the oligomers provided herein have an Fw value ranging from about 1 to 100, desirably about 2 to 25. Generally, smaller Fn and Fw values will be preferred where end-capping reactions are desired and larger Fn and Fw values will be preferred where coupling reactions are desired.

Although the ester groups provide potentially reactive functional groups, Fn and Fw values for the oligomers are determined by the most reactive functional group presented on the oligomer molecule. For this reason, the Fn and Fw values and ranges quoted herein do not take the ester groups into consideration, i.e. for an epoxy-functional oligomer, a cited Fn value of 1.4 refers only to the epoxy moiety. However, it should be understood that for some oligomers, such as polyacrylates, the inherent ester groups are also functional groups present on the oligomers, yet, for the purposes of this disclosure, the Fn and Fw values for these polyacrylates are zero. Therefore the Fn and Fw values and ranges cited above would not be applicable to such oligomers. The optimal extent of oligomer functionalization will vary depending upon the intended application for the modified anionically polymerized polymer. By way of illustration, preferred ranges are provided in the Applications section below for various applications.

Suitable acrylic monomers include functional and non-functional acrylates and methacrylates. Examples of suitable acrylic monomers include, but are not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, iso-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, 2-ethylhexyl methacrylate, n-octyl methacrylate, iso-octyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

Examples of suitable epoxy functional acrylic monomers include, but are not limited to, those containing 1,2-epoxy groups such as glycidyl acrylate, glycidyl methacrylate, and 4-vinyl-1-cyclohexene 1,2 epoxide.

Examples of suitable acid functional acrylic monomers include, but are not limited to, those containing carboxylic acid groups such as acrylic acid, methacrylic acid, and maleic acid.

Examples of suitable anhydride functional acrylic monomers include, but are not limited to, maleic anhydride, itaconic anhydride, and citraconic anhydride.

In addition to the acrylic monomers, the oligomers may include other free-radically polymerizable monomers, such as vinyl aromatic monomers. Suitable vinyl aromatic monomers include styrenic monomers. Suitable styrenic monomers include, but are not limited to, styrene, α-methylstyrene, p-methylstyrene, t-butylstyrene, o-chlorostyrene, and vinyl pyridine.

The chain extenders listed in U.S. Pat. No. 6,984,694, issued Jan. 10, 2006, may be used as oligomers in the production of the oligomer-modified anionically polymerized polymers described herein. The entire disclosure of the U.S. Pat. No. 6,984,694, is incorporated herein by reference.

U.S. Pat. No 6,984,694, incorporated above by reference, discloses: "The molecular weight ranges above include various embodiments wherein Mn ranges from 1000 to about 5000, including from 1500 to 4000, and further including from 2000 to 3000. The molecular weight ranges above also include various embodiments wherein Mw ranges from 1500 to about 18000, including from 3000 to 13000, and further including from 4000 to 8500." Also, "In various exemplary embodiments, the chain extenders have an EEW of from about 180 to about 300, an Efn value from about 4 to about 12 and a PDI of from about 1.5 to about 2.8. In other exemplary embodiments, the chain extenders have an EEW of from about 300 to about 500, an Efn value of from about 4 to about 12 and a PDI of from about 2.8 to about 3.2. In still other exemplary embodiments, the chain extenders have an EEW of from about 500 to about 700, an Efn value of from about 4 to about 12 and a PDI of from about 3.2 to about 4.5."

The oligomers are characterized by low molecular weights. For example, the oligomers may have a number average molecular weight of no more than about 10,000 and may have a weight average molecular weight of no more than about 60,000. This includes oligomers having a number average molecular weight of about 1,000 to about 10,000 and further includes oligomers having a number average molecular weight of about 1,500 to about 5,000. Also included are oligomers having a weight average molecular weight of about 1,500 to about 40,000 and oligomers having a weight average molecular weight of about 2,500 to about 20,000. However, the oligomers are significantly larger than small molecules which have been used to modify anionically polymerized polymers. Typically, the oligomers have a number average molecular weight of at least about 500, desirably at least about 1000 and a weight average molecular weight of at least 1000, desirably at least about 1500.

The use of oligomers having low molecular weights as capping and coupling agents for anionically polymerized polymers is advantageous because it allows the properties of the modified anionically polymerized polymers to be tailored to a degree that is not possible with small molecule and high molecular weight polymer capping and coupling agents. These properties that it is frequently desirable to control are the solubility parameters, glass transition temperatures, and surface activities of the oligomers. These properties are important in many applications because they may affect the adhesion, compatibility, miscibility and dispersibility characteristics of the oligomers and of the oligomer-modified anionically polymerized polymers made therefrom.

The properties of the oligomers may vary over a wide range depending on the comonomer composition, the molecular weight distribution and the functionalization of the oligomers. For example, oligomers having glass transition temperatures ranging from about 80° C. to about 150° C. may be used to make oligomer-modified anionically polymerized polymers.

The oligomers provided herein may have a wide range of solubility parameters. Generally, the solubility parameters for the oligomers may vary over a range of about 0 to 30. This includes oligomers having a solubility parameter of about 13 to about 20. The compatibility of an oligomer (and the oligomer-modified anionically polymerized polymer made therefrom) for a given application may be predicted by the difference between the solubility parameter the oligomer and the solubility parameter of the polymer component or components present in the composition to which the oligomer-modified anionically polymerized polymer is to be added. Thus oligomers may be selected for a given application by matching the solubility parameter of the oligomer to that of a polymer component in a composition with which the oligomer-modified anionically polymerizable polymer is to be combined. For example, oligomers intended to modify anionically polymerizable polymers for use in asphalt may be designed to have solubility parameters similar to those of the aromatic and natural fractions present in the asphalt. For example, the solubility parameters of the oligomers may be tailored to come within four, and desirably two, units or less of the optimum solubility parameter for a given application. By way of illustration, oligomers having solubility parameters that are sufficiently "matched" to various polymer systems for various applications are described in the Applications section below.

The surface energy of the oligomers may be tailored to lie within 10, and desirably within 5, dyne or less of the optimum surface energy for a given application.

The oligomers may be made using conventional polymerization techniques, including continuous, batch and semi-batch polymerizations. However, the oligomers are desirably made using the production techniques described in U.S. patent application Ser. No. 09/354,350 and U.S. Pat. No. 6,552,144, the entire disclosures of, which are incorporated herein by reference. Briefly, these processes involve continuously charging into a reactor at least one acrylic monomer, and optionally one or more other monomers that are polymerizable with the acrylic monomer, wherein at least one of the monomers is an ester-functional, carboxy-functional, anhydride-functional, or epoxy-functional monomer. In one embodiment the reactor charge includes at least one epoxy-functional (meth)acrylic monomer, at least one styrenic and/or (meth)acrylic monomer, and optionally one or more other monomers that are polymerizable with the epoxy-functional monomer, the styrenic monomer, and/or the (meth)acrylic monomer, wherein "(meth)" is used to indicate both methacrylic and acrylic.

The reactor may also optionally be charged with at least one free radical polymerization initiator and/or one or more solvents. Examples of suitable initiators and solvents are provided in U.S. patent application Ser. No. 09/354,350. Briefly, the initiators suitable for carrying out the process are compounds which decompose thermally into radicals in a first order reaction, although this is not a critical factor. Suitable initiators include those with half-life periods in the radical decomposition process of about 1 hour at temperatures greater or equal to 90° C. and further include those with half-life periods in the radical decomposition process of about 10 hours at temperatures greater or equal to 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane, 2,2"-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)hexyne-3, and other similar initiators well known in the art. The initiators di-t-butyl peroxide and di-t-amyl peroxide are particularly suitable. Other free-radical polymerization techniques suitable for producing the oligomers may be found in U.S. Pat. No. 6,605,681, the entire disclosure of which is incorporated herein by reference.

The initiator may be added with the monomers. The initiators may be added in any appropriate amount, but preferably the total initiators are added in an amount of about 0.0005 to about 0.06 moles initiator(s) per mole of monomers in the feed. For this purpose initiator is either admixed with the monomer feed or added to the process as a separate feed.

The solvent may be fed into the reactor together with the monomers, or in a separate feed. The solvent may be any solvent well known in the art, including those that do not react with acrylic monomers at the high temperatures of the continuous process described herein. The proper selection of solvent may help decrease or eliminate the gel particle formation during the continuous, high temperature reaction. Such solvents include, but are not limited to, xylene, toluene, ethyl-benzene, Aromatic-100®, Aromatic-150®, Aromatic-200® (all Aromatics available from Exxon), acetone, methylethyl ketone, methyl amyl ketone, methyl-isobutyl ketone, N-methyl pyrrolidinone, and combinations thereof. When used, the solvents are present in any amount desired, taking into account reactor conditions and monomer feed. In one embodiment, one or more solvents are present in an amount of up to 40% by weight, up to 15% by weight in a certain embodiment, based on the total weight of the monomers.

The reactor is maintained at an effective temperature for an effective period of time to cause polymerization of the monomers to produce an oligomer from the monomers.

A continuous polymerization process allows for a short residence time within the reactor. The residence time is generally less than one hour, and may be less than 30 minutes. In some embodiments, the residence time is generally less than 20 minutes, and may be less than 15 minutes.

The process for producing the oligomers may be conducted using any type of reactor well-known in the art, and may be set up in a continuous configuration. Such reactors include, but are not limited to, continuous stirred tank reactors ("CSTRs"), tube reactors, loop reactors, extruder reactors, or any reactor suitable for continuous operation.

A form of CSTR which has been found suitable for producing the oligomers is a tank reactor provided with cooling coils and/or cooling jackets sufficient to remove any heat of polymerization not taken up by raising the temperature of the continuously charged monomer composition so as to maintain a preselected temperature for polymerization therein. Such a CSTR may be provided with at least one, and usually more, agitators to provide a well-mixed reaction zone. Such CSTR may be operated at varying filling levels from 20 to 100% full (liquid full reactor LFR). In one embodiment the reactor is more than 50% full but less than 100% full. In another embodiment the reactor is 100% liquid full. The continuous polymerization is carried out at high temperatures. In one embodiment, the polymerization temperatures range from about 180° C. to about 350° C., this includes embodiments where the temperatures range from about 190° C. to about 325° C., and more further includes embodiment where the temperatures range from about 200° C. to about 300° C. In another embodiment, the temperature may range from about 200° C. to about 275° C.

The anionically polymerized polymers can be made by any suitable method known in the art, such as those described in U.S. Pat. Nos. 3,281,383, and 3,753,936 which are incorporated herein in their entirety by reference. In these methods the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Examples of these initiators include methyllithium, ethyllithium, t-butyllithium, n-butyllithium, n-decyllithium, isopropyllithium, eicosyllithium, cylcloalkyllithium compounds, such as cyclohexyllithium, and aryllithium compounds, such as phenyllithium, naphthllithium, p-toluyllithium, and the like. The amount of initiator varies depending upon the desired molecular weight of the product anionically polymerized polymer. Number average molecular weights between about 20,000 and 300,000 can be obtained by adding about 5.0 to 0.33 millimoles of the RLi initiator per mole of monomers corrected by the factor 100/(MW of monomer).

In the case of anionically polymerized homopolymers such as polystyrene, polyisoprene and polybutadiene, the corresponding monomer is added to contact the initiator in a suitable reaction zone under an effective temperature and residence time to complete the monomer addition reactions. One convenient way to make anionically polymerized block copolymers such as SB, SBS, SI and SIS, and the like, is by polymerizing the styrenic monomer in the presence of the organolithium initiator to form the initial polymer block and subsequently adding the conjugated diene to the polymerization mixture to produce a block copolymer of the styrenic and conjugated diene monomers. Additional blocks can be added by continuing alternating feeds of styrenic and conjugated diene monomers. In addition to anionically polymerized homopolymers and block copolymers, anionically polymerized random copolymers such as different grades of SBR and SIR can be made by adding several types of monomer simultaneously to the reaction zone. The sequence length distributions of the monomers in these random chains can be further altered by the use in the reaction mix of chemical compounds known as randomizers. Alternatively, anionically polymerized tapered block copolymers such as SB and SI can be obtained by adding the conjugated diene monomer to the reaction zone prior to the full consumption of the styrenic monomer, in this manner a transition random copolymer is formed between the styrenic and conjugated diene monomer blocks. People skilled in the art understand the differences in characteristics, properties and applicability that these different kinds of anionically polymerized polymers and copolymers have.

The anionic polymerization is normally carried out at temperatures in the range of −100° C. to 150° C., preferably between −75° C. and 75° C. Normally 50 to 90% of a reaction solvent is used to control the viscosity inside the reaction zone, preferably 70 to 85%. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone and methyl ethyl ketone. Typical residence times for anionic polymerization vary depending on the reaction temperature and initiator level between 0.1 and 5 hours, preferable from 0.2 to 2 hours.

The resulting anionically polymerized polymers contain a very high percentage of molecules in which a lithium atom is positioned at the chain end as a counterion to the anion at the chain end monomer unit of the polymer chains. Impurities present in the system, such as water or alcohol will tend to reduce the amount of lithium terminated anionically polymerized polymer formed. The lithium terminated anionically polymerized polymer is called a "living polymer" and can be further reacted with functional compounds such as the oligomers of this invention.

The oligomer-modified anionically polymerized polymers may be made following well known methods in the art such as those described in U.S. Pat. Nos. 3,281,383 and 3,753,936 by charging the oligomers into an anionic polymerization reaction zone after the "living" anionically polymerized polymers have been formed, that is, prior to any addition of materials such as water, acid or alcohol commonly added to inactivate and/or remove the lithium atoms present in the polymer. The oligomers may be added to the reaction zone after being dissolved in a suitable reaction solvent. The solvent is desirably the same as the one used during the anionic polymerization and the oligomer contents in this solvent is desirably controlled such that the viscosity of the oligomer solution is equal to or less than the viscosity of the anionically polymerized polymer solution in the reaction zone. Normally the oligomers of this invention are tailored to be soluble in the same solvents used in the anionic polymerization and the right viscosities are achieved between 10 and 60% solids. Because anionic polymerization is typically carried out in cyclohexane or n-hexane, it is advantageous to use oligomers that are soluble in these solvents. The functional groups on the oligomers readily react with the carbanions on the anionically polymerized polymers to produce the modified polymers.

The ratio of oligomer to anionically polymerized polymer in the oligomer-modified anionically polymerized polymers may vary over a broad range, depending on the intended application for the reaction product. In some illustrative embodiments, the molar ratio of oligomer to anionically polymerized polymer in the reaction product is about 0.05 to 2. This includes embodiments where the molar ratio of oligomer to anionically polymerized polymer in the reaction product is about 0.1 to 1. The weight of the oligomer-modified anionically polymerized polymers will also vary depending on the intended application. Typically, the number average molecular weight of the oligomer-modified anionically polymerized polymer will range from about 5,000 to 1,800,000 g/mol, desirably about 60,000 to about 1,500,000 g/mol and more desirably about 20,000 to about 600,000 g/mol. For example, the oligomer-modified anionically polymerized polymers may have number average molecular weight of about 5,000 to 1,000,000 or from about 20,000 to 1,800,000.

The anionic polymerization reactions and the oligomer modification reactions may take place in situ, that is in a single reaction zone, as described above, or in different reaction zones. The former design tends to favor faster reactions while the latter design may be preferred when end-capping reactions are desired over coupling reactions. In some embodiments, a reaction apparatus having two or more reaction zones (e.g., reaction chambers) may be employed. In these embodiments, the anionic polymerization to form the anionically polymerized polymers may be carried out in a first reaction zone and the polymerization of the oligomers and the reaction of the oligomers with the anionically polymerized polymer may be carried out in a second reaction zone. In a variation of this embodiment, shown in FIG. 1, the reactor apparatus 100 may include a first reaction chamber 102, a second reaction chamber 104 in fluid communication with the first reaction chamber 102 and a third reaction chamber 106 in fluid communication with both the first 102 and second 104 reaction chambers. Each of the chambers is desirably equipped with mixing and heating means. Using this apparatus, solvents and monomers may be fed from their respective storage tanks (not shown) into the first reaction chamber 102 where anionic polymerization takes place. A portion of the living anionically polymerized polymer is then passed from the first reaction chamber 102 into the second reaction chamber 104 where it undergoes end-capping and/or coupling reactions with the oligomer. The second reaction chamber 104 is equipped with solvent and oligomer storage tanks (not shown) to allow the oligomer modifiers and appropriate solvents to be fed into the second reaction chamber. Another portion of the living anionically polymerized polymer is passed from the first reaction chamber 102 into the third reaction chamber 106 wherein it is fully or partially reacted with an anionic polymerization terminator and/or a conventional small molecule or polymeric coupling agent. This third reaction chamber 106 is equipped with solvent, terminator, and/or coupling agent storage tanks (not shown). The anionic polymer from the third reaction chamber 106 is then passed into the second reaction chamber 104 to provide a polymer mixture containing oligomer-modified anionically polymerized polymer and non-oligomer-modified anionically polymerized polymer and/or conventionally-modified anionically polymerized polymer.

Figure 2:
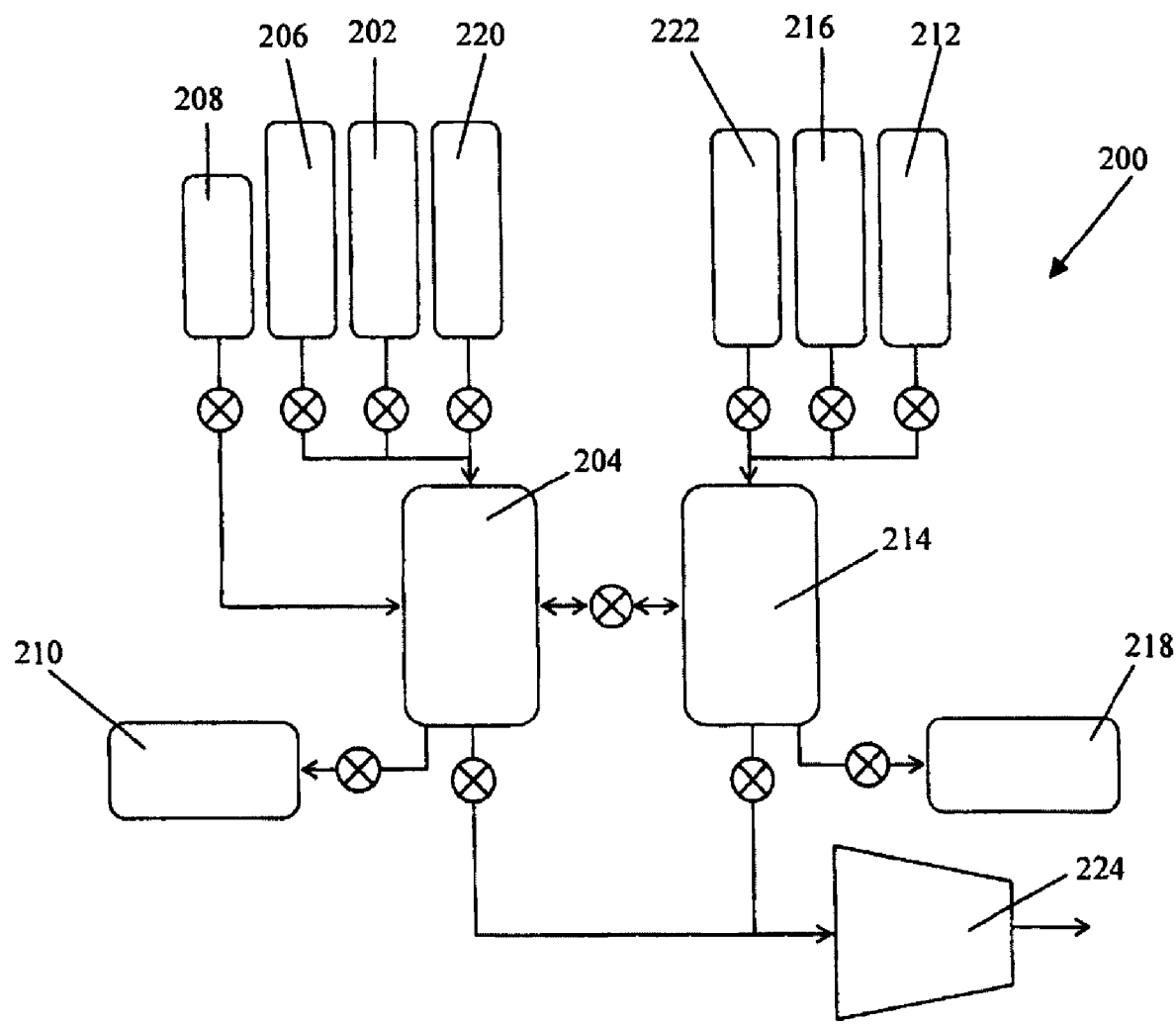
FIG. 2 is a schematic diagram of a second reactor apparatus that may be used to produce oligomer-modified anionically polymerized polymers.

FIG. 2 shows another apparatus 200 that may be used to produce the oligomer-modified anionically polymerized polymers provided herein. Using this apparatus, purified solvent from a first solvent tank 202 is pumped into a first reaction zone 204 to the appropriate level. The desired amount of purified monomer is then pumped into the first reaction zone 204 from a monomer storage tank 206. The contents of the first reaction zone 204 are then blanketed with nitrogen and thoroughly stirred while being cooled or heated to the appropriate polymerization temperature. Once the desired polymerization temperature is achieved, a predetermined amount of anionic polymerization initiator is rapidly injected into the first reaction zone 204 from an initiator tank 208 to obtain the desired polymer molecular weight. Anionically polymerizable comonomers can be added to first reaction zone 204 at any time during the polymerization stage to obtain random, block, or tapered block copolymers. Samples can be removed from the first reaction zone 204 at anytime during the polymerization stage and collected in a first sample vessel 210 for analysis and/or use. Purified solvent from a second solvent tank 212 is pumped into a second reaction zone 214 to the appropriate level. The desired amount of oligomer modifier is fed into the second reaction zone 214 from an oligomer storage tank 216, using the appropriate feeding system. The contents in the second reaction zone 214 are then blanketed with nitrogen and thoroughly stirred while being cooled or heated to the appropriate modification temperature. Once the desired degree of polymerization is achieved in the first reaction zone 204, the modifier solution in the second reaction zone 214 can be pumped into the first reaction zone 204 when chain coupling is desired. Conversely, the contents of the first reaction zone 204 can be pumped into the second reaction zone 214 when end-capping is desired. Samples can be removed from the second reaction zone 214 at anytime during the modification stage and collected in a second sample vessel 218 for analysis and/or use. Terminating agents can be added anytime during the polymerization and modification processes from terminator storage tanks 220, 222 to fully or partially quench the anionic species present. At the completion of this process the contents of either the first or second reaction zone 204, 214 may be pumped through a polymer isolation unit 224 for analysis and use.

By controlling the rate of addition of the oligomer solution to the living anionically polymerized polymer solution and the oligomer to lithium stoichiometry ratio, reactions between the oligomer and the living anionically polymerized polymer may favor either chain end-capping or chain coupling reactions. The reaction between the oligomer and the anionically polymerized polymer may be quite rapid. In some instances, the oligomer and the anionically polymerized polymers are allowed to react for less than about 1 minute and up to about 20 minutes. This includes embodiments where the oligomer and the anionically polymerized polymers are allowed to react for about 5 seconds to 5 minutes. Typical reaction temperatures for the production of the oligomer-modified anionically polymerized polymers include temperature of room temperature (i.e. about 20° C.) to about 150° C.

Chain end-capping, means that the most favored reaction product of the reaction between the oligomer and the living anionically polymerized polymer is that in which one oligomer chain is covalently bound to one anionically polymerized polymer chain, resulting primarily in a SO, BO, SBO, SBRO, $(SB)_m$ SOIO (where m is an interger), SIO, SBSO, SISO oligomer-modified anionically polymerized polymer, where O represents the oligomeric "block" formed at the chain end, with the corresponding deactivation of the living character of the resulting polymer molecule. Chain end-capping structures are favored whenever oligomer to lithium stoichiometry ratios larger than or equal to 1:1 are used (i.e., molar excess of oligomer over lithium). In certain embodiments ratios from 2:1 to 1:1 are used and rapid additions of the oligomer to the living anionically polymerized polymer is carried out. Alternatively, slow additions of the living anionically polymerized polymer may be made to the oligomer solution previously placed in the reaction zone.

Chain coupling means that the most favored reaction product of the reaction between the oligomer and the living anionically polymerized polymer is that in which one oligomer chain is covalently bound to more than one anionically polymerized polymer chain, resulting primarily in $(S)_nO$, $(B)_nO$, $(SB)_nO$, $(I)_nO$, $(SI)_nO$, $(SBS)_nO$ and $(SIS)_nO$ oligomer-modified anionically polymerized polymers, where O represents the oligomeric "block" formed in the chain interior, with the corresponding deactivation of the living character of the resulting polymer molecule, and (n) represents all numbers of the distribution characterized by Fn and Fw. Thus, given the functionality distribution of the oligomer, defined by its molecular weight distribution, the oligomer-modified anionically polymerized polymer obtained through favored chain coupling reactions may be a collection of mono, di, tri, tetra, penta blocks, etc. covalently bound to the oligomer where the number of blocks (n) has a number average equal to the oligomer Fn and a weight average equal to the oligomer Fw. Chain coupling structures are favored whenever oligomer to lithium stoichiometry ratios less than 1:1 are used (i.e., molar excess of lithium over oligomer), preferably when 1:(1/Fn) ratios are used (i.e., 1 equivalent of lithium per equivalent of oligomer functionality), and when slow additions of the oligomer to the living anionically polymerized polymer are carried out. In some instances the chain coupling reactions produce oligomer-coupled anionically polymerized polymers wherein the average number of anionically polymerized polymer chains couple to each oligomer is about 2 to 30, desirably about 5 to 15 and more desirably about 5 to 10.

When the anionically polymerized polymers are mixed and reacted with the oligomers a combination of end-capping and chain coupling reactions may result. In some instances at least about 10 mole % of the anionically polymerized polymers have undergone end-capping reactions. In some instances about 2 to 70 mole % of the anionically polymerized polymers have undergone chain coupling reactions. This includes embodiments where about 5 to 50 mole % of the anionically polymerized polymers have undergone chain coupling reactions and further includes embodiments where about 20 to 50 mole % of the anionically polymerized polymers have undergone chain coupling reactions.

In some embodiments of the methods provided herein, the living anionically polymerized polymers undergo partial termination prior to being exposed to or reacting with the oligomer. Partial termination means that a portion of the total living anionically polymerized polymers are deactivated to limit reactions between these anionically polymerized polymers and the oligomers. Partial termination may be carried out by adding a proton donor to the reaction to partially terminate the anionic polymerization or by increasing the temperature to thermally deactivate the living polymers. Suitable terminating agents that may be used to deactivate the living polymers include, but are not limited to, alcohols, water, impeded phenolic compounds and acids. Specific examples of such agents include isopropanol, octadecanol, butyl hydroxy toluene (BHT), and mixtures thereof. The portion of the anionically polymerized polymers that have undergone deactivation may be mixed with a portion of anionically polymerized polymers that has been oligomer-modified to provide a polymer blend with desired properties.

In some embodiments of the methods provided here, the living anionically polymerized polymers undergo partial coupling and/or end-capping reactions before being exposed to or reacting with the oligomers provided herein. Partial coupling and/or end-capping means that a portion of the total living anionically polymerized polymers undergo coupling and/or end-capping reactions with coupling or end-capping agents, other than the oligomers provided herein. The coupling agents desirably couple between 2 and 4 anionically polymerized polymer chains, although coupling agents capable of coupling a greater number of chains may also be employed. Suitable coupling agents for use in the partial coupling step include, but are not limited to, tin halides, silicon halides, or another functionalized silicon compound, such as a silane. Silicon tetrachloride or tin tetrachloride are specific examples of suitable coupling agents, with silicon tetrachloride being particularly well-suited for this application. The portion of the anionically polymerized polymers that have been so coupled or end capped may be mixed with a portion of anionically polymerized polymers that have been oligomer-modified and, optionally, a portion of the deactivated anionically polymerized polymers, to provide a polymer blend with desired properties.

A polymer blend containing a mixture of oligomer-modified anionically polymerized polymer with deactivated anionically polymerized polymer and/or anionically polymerized polymer that has been modified with an end-capping or coupling agent other than an oligomer may be produced in situ using stepwise reactions in a single reaction zone. Alternatively, the partial termination/partial coupling/end-capping and oligomer-modification reactions can be carried out on separate portions of the living anionically polymerized polymers in separate reaction zones and the resulting products may subsequently be blended together. The ratio of oligomer to living anionically polymerized polymer used to make the blend will affect the level of coupling, and therefore, the properties of the final blend. Therefore, by adjusting the relative degrees of oligomer modification, partial termination and partial coupling reactions, the blends may be tailored for use in a variety of applications. One illustrative application is as a compatibilizer in asphalt. This application is discussed in greater detail in the Applications section below.

An exemplary in situ approach may be carried out according to the following procedure. An anionic polymerization reaction is carried out to produce "living" polymer chains having a carbanion at one end of each chain. A portion (e.g., about 0 to about 95%) of the living polymer chains is then deactivated in a partial termination reaction to deactivate the chain ends to provide a linear anionically polymerized polymer and/or in a partial coupling reaction to couple the living chains to a coupling agent to provide radial polymers. A portion (e.g., 0.5 to 70%) of the polymer chains still living is then modified with an oligomer as previously described. Finally, a termination reaction is carried out to deactivate any remaining living polymer chain ends. Thus, this process may be used to produce a polymer blend including the oligomer-modified anionically polymerized polymers, linear anionically polymerized polymers and/or coupled radial polymers.

For either chain coupling or chain end-capping reactions carried out using a variety of oligomers, oligomer addition modes and stoichiometries, the temperature of these reactions may vary over a wide range to obtain the oligomer-modified anionically polymerized polymers. As one of skill in the art would understand, the reaction temperature may be selected to provide for a desired degree of reactivity based on the functionalities present. For example, temperatures ranging from about −78° C. to 150° C. may be employed. More typically, temperatures between 25° C. and 120° C. may be used. Faster reactions may be carried out at temperatures between 40° C. and 120° C. Under these conditions the reaction occurs very rapidly upon mixing the oligomer stream and the living anionically polymerized polymer. The reaction may continue for several hours. More commonly, a residence time in the reaction zone of less than 30 minutes, and desirably less than 10 minutes is sufficient for the full reaction between the oligomer and the living anionically polymerized polymer at the prescribed conditions. In some instances a residence time in the reaction zone of no more than about 3 minutes is sufficient.

As one of skill in the art would recognize, the described synthesis of the anionically polymerized polymer and the oligomer-modified anionically polymerized polymer can occur in a reaction setting comprising either a batch, a semi-continuous or a continuous processes operated at temperatures, solvent ratios and stream flow rates necessary to reach the described residence time and stoichiometry conditions.

Applications

As one of skill in the art would recognize, the optimal properties of the oligomer will depend on the intended application. Several exemplary applications for the oligomer-modified anionically polymerized polymers are provided below, along with a description of some suitable properties of the oligomers used in each application. These applications are provided for illustrative purposes only and are not intended to limit the scope of the invention.

In what follows, the cited solubility parameters for the oligomers and the oligomer-modified anionically polymerized polymers were measured according to the method for determining solubility parameters in Hansen Solubility Parameters A Users Handbook, C. M. Hansen, CRC Press, 2000, pp. 113, which is incorporated herein by reference. The glass transition temperatures ($T_g$) for the oligomers and/or of a given oligomer-modified anionically polymerized polymer were measured according to the standard DSC methods described in American Society for Testing and Materials (ASTM) standard procedures ASTM D 3417 & ASTM D 3418. Number (Fn) and Weight average (Fw) functionality per chain of the oligomer were obtained by a simple mass balance computation from the known oligomer composition using the Molecular Weight Distribution measured by GPC according to the Handbook of Plastics Testing Technology, $2^{nd}$ Edition, Wiley-Interscience pp. 189-194, which is incorporated herein by reference. The surface energies of the oligomers and oligomer-modified anionically polymerized polymers were determined using a classical contact angle approach. A FibroDat 1100 instrument was employed and contact angles were measured using 5 µl water droplets and the droplet profile was captured using an imaging technique at 01, 1.0 and 10 seconds.

Asphalt Reinforcement:

Asphalt modification presents unique challenges for the following reasons. Experts generally consider asphalt an emulsion of two main fractions: i) malthenes, which are divided into saturated compounds, aromatic naphthenes and polar aromatics; and ii) asphaltenes, which include the highest molecular weight compounds insoluble in solvents such as n-pentane or n-heptane (for example, see Analytical Chemistry 1969, Vol. 41, No. 4, 576-579; Energy & Fuels 2000, 14, 6-10; Energy and Fuels 2000, 14, 160-163; Energy & Fuels 2000, 14, 677-684). Asphalt is typically obtained from the residuum of a crude oil vacuum distillation tower, and generally has a boiling point of at least 350° C. at atmospheric pressure.

For asphalt to be used as a road and highway pavement, it should possess a series of physical characteristics that ensure long life and proper performance. For this reason asphalt is commonly modified with styrene-butadiene elastomers to improve its properties. These elastomer-modified asphalts are known in the industry as "asphalt binders." Although these elastomers allow notable improvement in some of asphalt's properties, when the modified asphalt is stored, the elastomer-asphalt mixture separates into two phases. One is a polymer phase, comprising mostly a polymer "swollen" with several compounds contained in asphalt, and the other is composed mostly of asphaltenes that are immiscible with the elastomer. This is due, at least in part, to the poor compatibility between polymers of the prior art and asphalt, due to the complexity of asphalt.

The inventors have discovered that the addition of the polymer compositions provided herein to asphalt, improves the performance of the asphalt and reduces or eliminates phase separation. Without wishing or intending to be bound to any particular theory of the invention, the inventors believe this improvement is due, at least in part, to the vinyl aromatic components of the anionically polymerized polymers and the oligomers, since vinyl aromatics, such as polystyrene are vitreous and may contribute a high elasticity value a property related to the rigidity of a material when they have a high Tg (e.g., close to 100° C., as for polystyrene). Also, at low temperatures, the conjugated diene component of the anionically polymerized polymers may provide adequate dissipation of thermal or mechanical fracture forces in the modified asphalt. This made possible by the low temperature of the conjugated diene component (i.e., significantly below Tg). In contrast, asphalt modifiers lacking a low-Tg monomer can not be successfully used in asphalts that will be subjected to low temperatures. Furthermore, it is believed that the oligomer-modified anionically polymerized polymers described herein function as asphalt reinforcers because they contain a balance of linear structures (i.e., the deactivated anionically polymerized polymers) and radial structures which form physical and/or chemical crosslinks in the asphalt matrix. This tends to raise the softening point and to decrease the phase segregation.

In countries, such as the United States, modified asphalts are evaluated according to the standards of the American Association of State Highway and Transportation Officials (AASHTO), which rates asphalts according to performance grade (PG). The standards of the American Society for Testing and Materials (ASTM) are also used for asphalt evaluation. Among the properties evaluated in modified asphalts are the following:

1) Ring and ball softening point (RBSP). This may be measured in accordance with ASTM D 36, which indicates the temperature at which asphalt softens and becomes unsuitable for the subject application. The softening point or temperature is taken using the Ring and Ball apparatus, also known as R&B.
2) Penetration at 25° C. a parameter relating to the rigidity of the modified asphalt. Penetration may be measured in accordance with ASTM D5, as the distance a weighted needle or cone will sink into the asphalt during a set period of time.
3) Brookfield Viscosity is a property relating to the stable stationary flow of asphalt. Brookfield Viscosity may be measured in accordance with ASTM D4404.
4) Resilience is a property that measures the elasticity of the asphalt material. Resilience may be measured in accordance with ASTM D 113.
5) Ruting factor: $G_*/\sin \delta$ at various temperatures is useful for determining the performance of modified asphalt at high temperatures. This factor indicates how resistant a pavement is to the permanent deformation that can occur over time with repeated loads at high temperature, or when the pavement is subjected to a load much greater than the maximum allowed in the original design. Therefore, higher Ruting factor values at high temperatures indicate that the asphalt can withstand greater deformation than materials that have lower Ruting factors at the same test temperature. The Ruting factor may be measured in accordance with AASHTO TP5.
6) Upper temperature limit. By determining the Ruting factor, it is possible to determine the upper temperature limit in accordance with AASHTO standards. The upper temperature limit relates to the maximum temperature at which the asphalt may retain adequate rigidity to resist rutting.
7) Lower temperature limit. By determining the Ruting factor, it is possible to determine the lower temperature limit in accordance with AASHTO standards. The lower temperature limit relates to the minimum temperature at which the asphalt may retain adequate flexibility to resist thermal cracking.
8) Phase segregation is a critical factor in the modification of asphalt with styrene-butadiene elastomers, due to the aforementioned problems.

It has been discovered that when about 0.1 to 10 parts by weight, and desirably about 0.2 to 5 parts by weight, of oligomers containing about 1 to 40 mole %, and desirably about 3 to 10 mole %, of epoxy or acid functional monomer with a balance of monomers and oligomer molecular weights designed to provide a solubility parameter of about 15 to 25, desirably 16 to 22, more desirably 17 to 20, $T_g$ of about 60° C. to −80° C., desirably about −20° C. to −70° C., Fn of about 1 to 6, desirably about 1 to 2, and Fw of about 1 to 15, desirably about 2 to 8, are used to modify anionically polymerized SB, SI, SBS, or SIS polymers having a $M_n$ of about 20,000 to 300,000, and desirably about 50,000 to 200,000, by end-capping reactions and/or coupling reactions, the resulting oligomer-modified anionically polymerized polymers have enhanced performance as asphalt reinforcing agents and compatibilizers.

The polymer compositions used for asphalt modification may include at least one of:
1) linear oligomer-modified anionically polymerized polymers made by end-capping reactions between the anionically polymerized polymers and oligomers, and
2) radial oligomer-modified anionically polymerized polymers made by coupling reactions between the anionically polymerized polymers and oligomers. The polymer compositions may optionally include linear anionically polymerized polymers made by the termination of the anionic polymerization with a termination agent (known as "non-modified anionically polymerized polymer" for the purposes of this disclosure). In addition the polymer compositions may also include linear anionically polymerized polymers that were end capped using end-capping agents other than the oligomer end-capping agent described herein and/or radial anionically polymerized polymers coupled with coupling agents other than the oligomer coupling agents described herein.

The oligomer-modified anionically polymerized polymers used for asphalt reinforcement are desirably composed of an anionically polymerized polymer, polymerized from at least one vinyl aromatic monomer and at least one conjugated diene monomer, and at least one functional oligomer obtained as described in this same patent application. In some embodiments, the fraction of radial oligomer-modified anionically polymerized polymer account for about 2 to 90 mole %, and desirably about 2 to 50%, of the total polymer composition (i.e. the oligomer-modified polymer plus any non-modified anionically polymerized polymer, and the fraction of non-modified linear anionically polymerized polymer and/or linear oligomer-modified anionically polymerized polymer desirably accounts for about 10 to 98 mole % and desirably about 50 to 98 mole % of the total polymer composition. In certain embodiments, the radial oligomer-modified anionically polymerized polymers have about 2 to 25 anionically polymerized polymer chains, and desirably about 2 to 18 anionically polymerized polymer chains coupled per oligomer, on average.

Two specific applications for which the reinforced asphalts may be used are road paving applications and roofing/waterproof coating applications. In some instances when the reinforced asphalt is used in a road paving application, 1 to 10 parts of the oligomer-modified anionically polymerized polymer, and desirably 2 to 5 parts, may be mixed with 99 to 90 parts, and desirably 98 to 95 parts, of an asphalt to improve the performance characteristics thereof. In some instances when the reinforced asphalt is used in a roofing or waterproof coating application, 5 to 20 parts of the oligomer-modified anionically polymerized polymer, and desirably 8 to 16 parts, may be mixed with 95 to 80 parts, and desirably 92 to 84 parts, of an asphalt to improve the performance characteristics thereof.

In certain embodiments, the oligomer-modified anionically polymerized polymers may confer asphalt compositions with one or more of the following properties: a) maximum application temperature of about 50° C. to 90° C., measured as the temperature at which the Rutting Factor or Dynamic Shear Stiffness ($G^*/\sin\delta$) (wherein $G^*$ is the complex modulus and $\delta$ is the phase angle measured as per AASHTO TP5) takes a value of 1.0 KPa); b) RBSP (measured as per ASTM D36) of about 40 to 70° C.; c) asphalt penetration at 25° C. (as per ASTM D5) of about 30 to 75 dmm for road paving applications or about 65 to 100 for roofing and waterproof coating applications; and d) morphology stability or phase separation index of no more than about 5% and desirably no more than about 2% for road paving applications and no more than about 25% and desirably no more than about 10% for roofing and waterproof coating applications. The phase separation index is measured as the percent difference between the RBSP measured at the top and bottom surfaces of a cylindrical probe, made in the interior of a sealed tube containing the formulated asphalt and aged at 163° C. for 48 hours in a vertical position without agitation, and frozen at 30° C. The percentage difference in RBSP provides a measure of the compatibility between the asphalt-rich phase and the polymer-rich phase in an asphalt/polymer blend. Compared to the same asphalt compositions made with the same anionically polymerized polymer, without the oligomer modification, the above referenced properties may represent an improvement of about 20 to 80% in dynamic shear rheometer stiffness; an increase of about 2° C. to 5° C. in RBSP; an improvement of about 5 to 20% in asphalt penetration; and an improvement of about 50 to 100% in phase separation.

Suitable asphalts for use with the oligomer-modified anionically polymerized polymers include, but are not limited to, AC-20 asphalts or other asphalt widely used in road paving such as native rock asphalts, lake asphalts, petroleum asphalts, airblown asphalts, cracked asphalts, and residual asphalts.

Impact Modification of Plastics and Engineering Thermoplastics:

It has been discovered that when about 0.1 to 20 parts by weight, and desirably about 0.3 to 10 parts by weight of oligomers are used to modify anionically polymerized polybutadiene, polyisoprene, SB, SI, SBS, $(SB)_mS$ or SIS or $(SI)_mS$ polymers having a $M_n$ of about 20,000 to 300,000 g/mol, and desirably about 50,000 to 100,000 g/mol, by a coupling reaction and/or an end-capping reaction, the resulting oligomer-modified anionically polymerized polymers have enhanced performance as impact modifiers for polar plastics blends, alloys and composites of polar plastics. In some such applications, the oligomers contain 0.5 to 50 mole %, desirably 1 to 15 mole %, of epoxy, anhydride, or acid functional monomer. In other such applications, the oligomers may be polyacrylates composed entirely of (meth)acrylate monomers. The oligomer molecular weights are desirably designed to provide a solubility parameter that differs from the solubility parameter of the plastic to be modified by about 0 to 6 units, desirably 0 to 2 units, a $T_g$ of about 120° C. to −70° C., desirably about 100° C. to −60° C., Fn of about 1 to 10, desirably 1.2 to 5, and Fw of about 1.5 to 40, desirably about 2 to 10.

In some such applications, about 1 to 15 parts by weight of the oligomer-modified anionically polymerized polymer, desirably about 2 to 10 parts by weight, compounded with about 99 to 85 parts by weight of a polar plastic, and desirably 98 to 90 parts by weight, confer such plastic compositions with the following properties compared to those obtained with the same composition, employing the same anionically polymerized polymer, without the oligomer modification: Izod Impact resistance (as per ASTM D256) improved by 5% to 150%.

Suitable polar plastics for use with the impact modifiers include, but are not limited to, a polyamide (PA), a polyester (PE), a polycarbonate (PC), a polysulfone, a polyether, a polyurethane (PU), and other polar plastics and blends and alloys thereof. Specific plastics that may be modified include, but are not limited to, PA 6, PA 6,6, PA 12, PBT, PET, PETG, PS, PS copolymers, SAN, ABS, PC/ABS, HIPS, PPE, PPE/PS, PPE/PA, PA/ABS, PC/ABS, PEI, PEK, PEEK, PSu, POM, and TPU.

Improved Adhesion of Pressure Sensitive Adhesives (PSA) and Hot Melt Adhesives (HMA):

It has been discovered that when about 0.1 to 20 parts by weight, and desirably about 0.1 to 10 parts by weight, of oligomers containing 0.5 to 10 mole % of epoxy, acid, or ester functional monomer with a balance of monomers and oligomer molecular weights designed to provide a solubility parameter that differs from the solubility parameter of the substrate to which the adhesive is to be applied by about 0 to 4 units, preferably 0 to 2 units, a $T_g$ of about 20° C. to −80° C., desirably about −10° C. to −80° C., Fn of about 0.25 to 5, desirably about 0.5 to 2, and Fw of about 0.5 to 15, desirably about 1 to 10, are used to modify anionically polymerized polybutadiene, polyisoprene, SB, SI, SBS, $(SB)_mS$, SIS or $(SI)_mS$ polymers having a $M_n$ of about 20,000 to 300,000 g/mol, desirably about 40,000 to 200,000 g/mol by a preferential end-capping reaction to yield a linear polymer in a proportion of about 40 to 60 mole %, preferably about 45 to 60 mole %, the resulting oligomer-modified anionically polymerized polymers provide enhanced performance as PSAs or HMAs, depending on the $T_g$ of the composition. Radial polymers may also be present due to coupling reaction with oligomer. The radial polymers typically have a Mn of about 80,000 to 1,600,000 g/mol wherein at least 5 mole % of the oligomer-modified anionically polymerized polymer has a Mn of about 800,000 to 1,600,000 g/mol.

In some such applications, about 10 to 40, desirably 15 to 30, and more desirably 18 to 25, parts by weight of the oligomer-modified anionically polymerized polymer is mixed with other conventional adhesive formulation components, such as tackifiers, stabilizers, plasticizers and antioxidants to confer such plastic compositions with improved properties compared to adhesives made with the same composition, employing the same anionically polymerized polymer, without the oligomer modification. Examples of suitable tackifiers include resins with high and low softening points which are compatible with the polymer. These include hydrogenated resins, rosin esters, polyterpene resins, terpene phenolic resins, and indene-cumarone resins. In some illustrative embodiments, the amount of tackifier resins in the composition ranges from about 45 to 65% by weight. Plasticizers, generally known as extending oils, include mineral oils, paraffinic oils, and naphtenic oils. In some illustrative embodiments, the amount of plasticizer in the composition ranges from about 15 to 30% by weight. The antioxidants may be used to inhibit the thermal and UV oxidation processes, and are typically added to the adhesive composition in amounts of about 0.05 to 3% by weight. Examples of antioxidants include phenolic compounds, phosphites, amines, and thio compounds. Some examples of commercially available adhesive components are listed in Table A below.

TABLE A

| Commercially Available Adhesive Components |
|---|
| RESINS |
| Rosin Esters: |
| Sylvalite RE100L[a] |
| Sylvalite RE115[a] |
| Sylvalite RE85L[a] |
| Foral 85[b] |
| Foral 105[b] |
| Pentalyn H[b] |
| Permalyn 3100[b] |

TABLE A-continued

| Commercially Available Adhesive Components |
|---|
| Styrenated Terpenes: |
| Sylvares ZT5100[a] |
| Sylvares ZT105LT[a] |
| Sylvares ZT115LT[a] |
| Polyterpene Resins: |
| Sylvares TR1100[a] |
| Sylvares TR7115[a] |
| Terpene Phenolics: |
| Sylvares TP2040[a] |
| Sylvares TP115[a] |
| Aliphatic Hydrocarbon Resins: |
| Piccotac 1100[b] |
| Piccotac 115[b] |
| Hydrogenated Hydrocarbon Resins: |
| Eastotac H100[b] |
| Eastotac H130[b] |
| PLASTICIZERS |
| Naphtenic |
| Shellflex 371[c] |
| Shellflex 3271[c] |
| RPO-104C[e] |
| Paraffinic |
| Shellflex 210[c] |
| Shellflex 270[c] |
| Shellflex 330[c] |
| Primol 352[d] |
| RPO-138[e] |
| P. OIL 50[e] |
| ANTIOXIDANTS |
| Phenolic |
| Irganox 1010[f] |
| Irganox 1076[f] |
| Irganox 565[f] |
| Irganox 1520[f] |
| Irganox 1098[f] |
| Anox 20[g] |
| Ultranox 276[h] |
| Phosphite |
| Alkanox TNPP[g] |
| Alkanox 240[g] |
| Ultranox 626[h] |
| Weston 618F[h] |
| Thio |
| Lowinox DSTDP[g] |
| Blends |
| Ultranox 877A[h] |

Available from:
[a]Arizona Chemical;
[b]Eastman/Hercules;
[c]Shell;
[d]Esso, ExxonMobil;
[e]IPISA; Ingenieria y Procesos Industriales, S.A.;
[f]Ciba Specialty Chemicals, Inc.;
[g]Great Lakes Chemical Corporation.;
[h]GE Specialty Chemicals.

Examples of properties and improvements that may be provided by the oligomer-modified anionically polymerized polymers include one or more of the following: a) tensile strengths (as per ASTM-D3759) above 4.0 kg/cm$^2$; b) peel strengths (as per ASTM D903) above 1.18 kg/cm with 100% cohesive failure; c) loop tack strengths above 3.2 kg/cm ; d)

shear strengths (as per ASTM D3654, using stainless steel plaques and weights of 500 g at 23° C.) above 10 days; and e) Brookfield viscosities (as per ASTM D1084) of 10 to 60, desirably 20 to 50 poise at 150° C. Compared to the same adhesive compositions made with the same anionically polymerized polymer, without the oligomer modification, the above referenced properties may represent an improvement of about 50 to 300% in tensile strength; an improvement of about 20 to 100% in peel strength; an improvement of about 50 to 300% in tack; and an improvement of about 100% to 800% in shear strength.

Elastomers and Thermoplastic Elastomers with Improved Adhesion to Metal, Wood, Glass, and Polar Plastic Substrates:

It has been discovered that when about 1 to 45 parts by weight, and desirably about 3 to 35 parts by weight, of oligomers containing 1 to 50 mole %, desirably 1 to 10 mole %, of epoxy, acid, or anhydride functional monomer with a balance of monomers and oligomer molecular weights designed to provide a surface energy level (dyne) that differs from the surface energy of the substrate to which the elastomer is to be applied by about 0 to 10 units, preferably 0 to 5 units, a $T_g$ of about −80° C. to 80° C., desirably about −70° C. to 70° C., Fn of about 1 to 10 and Fw of about 2 to 40, desirably about 3 to 25, are used to modify a linear anionically polymerized plastic, such as polystyrene or a thermoplastic elastomer, such as polybutadiene, polyisoprene, random SBR, tapered SBR, SB, SI, SBS, $(SB)_mS$, SIS or $(SI)_mS$ polymers having a $M_n$ of about 2,000 to 40,000 g/mol, desirably about 4,000 to 25,000 g/mol, by an end-capping reaction and/or coupling reaction, the resulting oligomer-modified anionically polymerized polymers have enhanced adhesion to polar substrates such that the oligomer-modified anionically polymerized polymers, and related plastic compositions show enhanced adhesion to the substrates compared to their non-oligomer-modified counterparts. For example the adhesion ratings (as per ASTM D3359 Method B) of the oligomer-modified anionically polymerized polymers may be improved by 1 to 3 units compared to their non-oligomer-modified counterparts. This property may enhance performance in tire and other rubber applications such as protective coatings and tie layers.

Suitable substrates for use with the oligomer-modified anionically polymerized polymers include metal, plastic, wood and glass. Metal substrates are particularly suited for use with the adhesives provided herein. Specific examples of substrate materials include, but are not limited to, stainless steel, carbon steel, iron, copper, and other metals, polar plastics such as polyamides, polycarbonates, ABS, PC/ABS alloys, SAN, polyesters and other plastics, polar substrates such as wood, glass, and other polar substrates.

Thermoplastics and Thermoplastic Elastomers with Improved Rheological and Mechanical Properties for Soft Touch and Injection Molding Applications: It has been discovered that when about 0.1 to 5 parts by weight, and desirably about 0.1 to 2 parts by weight, of oligomers are used to modify 99.9 to 95 parts of a linear anionically polymerized plastic, such as polystyrene, or a thermoplastic elastomer, such as a SB, SI, SBS, $(SB)_mS$, SIS or $(SI)_mS$ polymer having a $M_n$ of about 20,000 to 300,000 g/mol, desirably about 20,000 to 100,000 g/mol, by a preferential chain coupling reaction, the resulting oligomer-modified anionically polymerized polymer processed by extrusion molding, injection molding or compression molding has enhanced Theological and mechanical properties compared to similar compositions employing the same anionically polymerized polymer without the oligomer modification. In some such applications the oligomer contains about 0.5 to 60 mole %, desirably about 3 to 15 mole %, of epoxy, or acid, functional monomer. In other such applications the oligomer may be polyacrylates composed entirely of (meth)acrylate monomers. The oligomer molecular weights are desirably designed to provide a $T_g$ of about −70° C. to 120° C., desirably about −60° C. to 100° C., Fn of about 1 to 15, desirably about 1.2 to 10, and Fw of about 1 to 60, desirably about 2 to 25.

Thermoplastics and Engineering Thermoplastics with Improved Flow Modification and/or Rheology Control:

It has been discovered that when about 0.05 to 40 parts by weight, and desirably about 0.05 to 30 parts by weight, of oligomers are used to modify 99.95 to 60 parts by weight, and desirably 99 to 70 parts by weight, of an anionically polymerized thermoplastic, such as polystyrene, having a $M_n$ of about 3,000 to 40,000 g/mol, desirably about 5,000 to 30,000 g/mol, by a chain coupling and/or end-capping reaction, the resulting oligomer-modified anionically polymerized polymer has enhanced flow and rheological properties compared to similar compositions employing the same anionically polymerized polymer without the oligomer modification. In some such applications, the oligomers contain about 1 to 60 mole %, desirably about 5 to 15 mole %, of epoxy or acid functional monomer. In other such applications the oligomers are polyacrylates composed entirely of (meth)acrylate monomers. The oligomer molecular weights are desirably designed to provide a $T_g$ of about −80° C. to 80° C., desirably about −70° C. to 70° C., Fn of about 1 to 10 and Fw of about 1 to 20, desirably about 2 to 10.

In some such applications, about 1 to 10 parts by weight of the oligomer-modified anionically polymerized polymer, and desirably about 2 to 7 parts by weight, may be mixed with 99 to 90 parts by weight of a thermoplastic, and desirably about 98 to 93 parts by weight of the thermoplastic to improve the characteristics thereof.

The resulting thermoplastic/oligomer-modified anionically polymerized polymer blends may have melt flow indices (as per ASTM D 1238) that vary over a wide range. In some instances, the oligomer-modified anionically polymerized polymers may be used to decrease the melt flow index, while in other instances the oligomer-modified anionically polymerized polymers may be used to increase the melt flow index. In either case, in some embodiments of the blends, the melt flow index is changed by at least about 5% due to the inclusion of the oligomer-modified anionically polymerized polymers. This includes embodiments where the melt flow index is changed by at least about 10%, at least about 30%, at least about 50% and even at least about 100%.

Plastics with Improved Rheology:

It has been discovered that when about 0.1 to 40 parts by weight, and desirably about 1 to 30 parts by weight, of oligomers are used to modify 99.9 to 60 parts by weight, and desirably 99 to 70 parts by weight, of an anionically polymerized thermoplastic, such as polystyrene, having a $M_n$ of about 3,000 to 50,000 g/mol, desirably about 5,000 to 28,000 g/mol, by a chain coupling and/or end-capping reaction, the resulting oligomer-modified anionically polymerized polymers has enhanced flow and rheological properties compared to similar compositions employing the same anionically polymerized polymer without the oligomer modification. The resulting oligomer-modified anionically polymerized polymers exhibit enhanced reheological properties, as characterized by parallel plate viscometry using a Rheoletric Scientific SR 5000 with 25 mm diameter parallel plates at 0.01 and 4.0 s$^{-1}$, compared to similar anionically polymerized polymers without the oligomer modification. The degree of shear thinning can be determined by the ratio of the viscosity at 0.01 s$^{-1}$ to viscosity at 4. s$^{-1}$. In some such applications, the oligomers contain about 1 to 60 mole %, desirably about 5 to 45 mole %, of epoxy or acid functional monomer. In other such applications, the oligomers are polyacrylates composed entirely of (meth)acrylate monomers. The oligomer molecular weights are desirably designed to provide a $T_g$ of about −80° C. to 80° C., desirably about −70° C. to 70° C., Fn of about 1 to 10 and Fw of about 1 to 40, desirably about 2 to 25.

The resulting oligomer modified anionically polymerized polymers may exhibit enhanced Theological properties, as characterized by parallel plate viscometry compared to similar linear materials without oligomer modification. For example, these oligomer modified anionically polymerized polymers may demonstrate enhanced shear thinning compared to similar linear materials without oligomer modification. This includes at least about a 50% increase in shear thinning, at least about 100%, at least about 250%, and even at least about 500% increase in shear thinning.

The invention will be further described by reference to the following examples which are presented for the purpose of illustration only and are not intended to limit the scope of the invention.

EXAMPLES

Example 1

Preparation of Oligomers, Anionically Polymerized Polymers and Oligomer- Modified Anionically Polymerized Polymers Preparation of Functional Oligomers I:

Fourteen different functional oligomers, labeled oligomers O1 to O14 below, were designed and prepared in 8 to 1200 liter free radical continuous polymerization reactor systems according to the teachings of U.S. patent application Ser. No. 09/354,350. The specific synthesis conditions and oligomer characterization parameters are given in the Tables 1a. 1b. below. The abbreviations used below are defined as follows, STY=styrene, 2-EHA=2-ethylhexyl acrylate, MMA=methyl methacrylate, i-BMA=iso-butyl methacrylate, MA=methyl acrylate, GMA=glycidyl methacrylate, AA=acrylic acid, MAH=maleic anhydride, and BA=butyl acrylate.

TABLE 1a

| Functional Oligomers | | | | | | | |
|---|---|---|---|---|---|---|---|
|  | O1 | O2 | O3 | O4 | O5 | O6 | O7 |
| STY (%)$^a$ | 25 | 25 | 18.30 | 18.57 | 72.75 | 10.35 | 63.56 |
| MMA (%)$^a$ | — | — | 1.73 | 1.66 | 1.13 | 1.80 | 31.29 |
| 2-EHA (%)$^a$ | 67 | 67 | 71.44 | 71.13 | — | 79.00 | — |
| GMA (%)$^a$ | — | 8 | 8.53 | 8.64 | 26.12 | 8.85 | 5.15 |
| AA (%)$^a$ | 8 | — | — | — | — | — | — |
| Solvent (%)$^b$ | 9.7 | 16.7 | 4.7 | 0.65 | 0.48 | 4.7 | 0.8 |
| Di-tertbutyl peroxide initiator (%)$^b$ | 0.3 | 0.3 | 0.3 | 0.3 | 1.12 | 0.3 | 1.43 |
| Reactor Volume (liter) | 8 | 8 | 8 | 600 | 8 | 8 | 8 |
| Reaction Temperature (° C.) | 186 | 185 | 202 | 199 | 196 | 202 | 204 |
| Residence Time (min) | 12 | 12 | 12 | 12 | 12 | 12 | 12 |
| Oligomer Functionality | Acid | Epoxy | Epoxy | Epoxy | Epoxy | Epoxy | Epoxy |
| Solubility Parameter | 17.20 | 17.27 | 17.19 | 17.21 | 18.71 | 17.17 | 17.64 |
| Fn | 1.51 | 1.50 | 1.32 | 1.31 | 5.16 | 1.28 | 1.22 |
| Fw | 10.01 | 6.16 | 4.23 | 3.59 | 12.61 | 3.30 | 3.13 |
| $T_g$ (midpoint ° C.) | −39.4 | −44.7 | −53.9 | −54.4 | 56.0 | −58.0 | 58 |
| $M_n$ (g/mol) | 3,151 | 3,089 | 2,535 | 2,638 | 2,250 | 2,450 | 2,450 |
| $M_w$ (g/mol) | 20,912 | 12,695 | 8,132 | 7,239 | 5,500 | 6,300 | 6,300 |
| Functionality Equivalent weight (g/mol) | 2,089 | 1,777 | 1,916 | 2,017 | 440 | 1,910 | 2,010 |

In table 1b, a = mole % of monomer mixture and b = weight % of total reaction mixture.

TABLE 1b

| Functional Oligomers | | | | | | | |
|---|---|---|---|---|---|---|---|
|  | O8 | O9 | O10 | O11 | O12 | O13 | O14 |
| STY (%)$^a$ | — | 56.15 | 32.23 | 10.55 | 73.47 | 55.60 | — |
| MMA (%)$^a$ | — | 1.24 | 16.76 | 1.80 | 25.45 | 1.33 | — |
| 2-EHA (%)$^a$ | — | — | — | 79.0 | — | — | — |
| BA (%)$^a$ | 100 | — | — | — | — | — | 100 |
| i-BMA (%)$^a$ | — | — | 23.61 | — | — | — | — |
| MA (%)$^a$ | — | — | 19.50 | — | — | — | — |
| GMA (%)$^a$ | — | 42.61 | 7.90 | 8.85 | — | 43.07 | — |
| MAH (%)$^a$ | — | — | — | — | 1.08 | — | — |
| Solvent (%)$^b$ | 4.2 | 1.77 | 8 | 4.7 | 10.00 | 7.8 | 8.0 |
| Di-tertbutyl peroxide initiator (%)$^b$ | 1.5 | 1.38 | 1.3 | 0.3 | 0.1 | 1.5 | 0.1 |
| Reactor Volume (liter) | 600 | 1200 | 38 | 8 | 8 | 1200 | 38 |
| Reaction Temperature (° C.) | 243 | 192 | 189 | 184 | 197 | 192 | 190 |
| Residence Time (min) | 12 | 15 | 12 | 12 | 12 | 15 | 12 |
| Oligomer Functionality | Ester | Epoxy | Epoxy | Epoxy | Anhydride | | |

TABLE 1b-continued

| | Functional Oligomers | | | | | | |
|---|---|---|---|---|---|---|---|
| | O8 | O9 | O10 | O11 | O12 | O13 | O14 |
| Solubility Parameter | 17.22 | 19.25 | 17.63 | 17.24 | 17.59 | 19.26 | 17.22 |
| Fn | 8.59 | 8.86 | 1.64 | 1.84 | 1.44 | 7.60 | 24.73 |
| Fw | 13.28 | 24.11 | 5.52 | 8.17 | 5.21 | 22.69 | 367.10 |
| $T_g$ (midpoint ° C.) | −66.0 | 54 | 30.8 | −57.8 | 97.1 | 50.4 | −52 |
| $M_n$ (g/mol) | 1,100 | 2,500 | 2,300 | 3,440 | 9,980 | 2150 | 3,165 |
| $M_w$ (g/mol) | 1,700 | 6,800 | 7,750 | 15,250 | 35,910 | 6420 | 34,189 |
| Functionality Equivalent weight (g/mol) | 128 | 285 | 1404 | 1868 | 6933 | 283 | 128 |

In Table 1b, a = mole % of monomer mixture and b = weight % of total reaction mixture.

Preparation of Living Anionically Polymerized Polymers I:

Eight different living anionically polymerized polymers (APP) were designed and prepared in 1 to 200 Liter reactor systems operated in batch, semi-continuous or continuous mode according to the teachings of this invention. Briefly, prior to being fed into the reactor, solvent and monomers were purified to decrease their moisture content to a maximum of 8 ppm by flowing through a set of columns packed with alumina and molecular sieves. Purified solvent was then loaded into the reactor zone followed by the $1^{st}$ monomer feed. This reaction mixture was heated to the initial reaction temperature (Ti). As Ti was reached, n-butyl lithium or other suitable initiator was added neat or in a suitable solvent solution to the reaction zone. The amount of initiator is stoichiometrically calculated to form individual blocks and/or final living anionically polymerized polymers with number average and weight average molecular weight about a target value. The polymerization step was then allowed to proceed in either isothermal or quasi-adiabatic mode to a final temperature (Tf) and/or for a prescribed residence time (RTp). During the polymerization step sequential addition(s) of different monomers were carried out in a programmed batch or semi-batch mode depending on whether a homopolymer, random copolymer, block copolymer or tapered block copolymer was desired. At the end of this process living anionically polymerized polymer were obtained.

The specific synthesis conditions and APP characterization parameters are given in the Table 2 below. The abbreviations used below are defined as follows, STY=styrene, B=1,3 butadiene, n-BuLi=n-butyl lithium, CH=cyclohexane, and TMEDA=N,N,N"N"-tetramethyl ethylene diamine. In Table 2, "the first peak temperature" refers to the temperature recorded after the first monomer addition and polymerization, and "the final peak temperature" refers to the temperature after the last monomer addition and polymerization.

TABLE 2

Living Anionically Polymerized Polymers

| | Living Anionically Polymerized Polymers | | | | | | | |
|---|---|---|---|---|---|---|---|---|
| | APP 1 | APP 2 | APP 3 | APP 4 | APP 5 | APP 6 | APP 7 | APP 8 |
| $1^{st}$ addition STY (%)$^a$ | 25.93 | 25.93 | 25.09 | 24.80 | 24.00 | 30.0 | 30.0 | 29.57 |
| $1^{st}$ addition B (%)$^a$ | 74.07 | 74.07 | 74.91 | 75.20 | 76.00 | — | — | — |
| TMEDA (%)$^a$ | — | — | — | — | — | 0.19 | 0.19 | 0.19 |
| $2^{nd}$ addition B (%)$^a$ | — | — | — | — | — | 70.0 | 70.0 | 70.24 |
| CH (%)$^b$ | 86.11 | 86.11 | 83.46 | 83.60 | 78.21 | 85.30 | 85.30 | 85.06 |
| Reactor Volume (liter) | 100 | 100 | 100 | 170 | 2 | 100 | 100 | 170 |
| Initial Reaction Temperature (° C.) | 52 | 50 | 50 | 50 | 50 | 55 | 52 | 52 |
| First Peak Temperature) (° C.) | | | | | | 67 | 64 | 62 |
| Final Peak Temperature (° C.) | 103 | 106 | 112 | 118 | 105 | 98 | 102 | 115 |
| Target $1^{st}$ block $M_n$ (g/mol) | — | — | — | — | — | 12,000 | 12,000 | 12,000 |
| Target APP $M_n$ (g/mol) | 110,000 | 110,000 | 110,000 | 110,000 | 110,000 | 60,000 | 60,000 | 60,000 |
| Type of APP | Tapered Block SB | Tapered Block SB | Tapered Block SB | Tapered Block SB | Tapered Block SB | Diblock SB | Diblock SB | Diblock SB |
| 1,2 structures in B block (%) | 10 | 10 | 10 | 10 | 10 | 50 | 49 | 30 |

In Table 2, a = weight % of total monomer mixture and b = weight % of total reaction mixture.

Preparation of Living Anionically Polymerized Polymers II:

Ten different living APPs were designed and prepared using a reactor system comprised of two stirred reactors in series separated with a Rotaflo® stopcock, as shown in FIG. 2. The first reactor was fit with a side arm with an ampoule attached for collection of samples. An initiator injection arm, and monomer and solvent feed ampoules were also attached. This reactor was used to carry out the anionic polymerization reaction to obtain living APP. The second reactor was subsequently used to perform the oligomer modification when end-capping was sought. Initiator was injected into the polymerization reactor through the injection arm and solvent was then fed to the reactor directly after distillation. The reactor was then sealed and blanketed with nitrogen, and heated to the reaction temperature. At this temperature the purified monomer(s) was added and the reaction was allowed to proceed for a prescribed residence time. At the end of the reaction a sample of the living APP was quenched with a suitable termination agent (TA) to establish its physical characteristics prior to the modification with the functional oligomers.

The specific synthesis conditions and APP characterization parameters are given in the Tables 3a and 3b below. The abbreviations used below are defined as follows, STY=styrene, sec-BuLi=sec-butyl lithium, and BZ=Benzene.

Preparation of Living Anionically Polymerized Polymers III:

Five different living APPs were designed and prepared in 1 to 200 Liter reactor systems operated in batch, semi-continuous or continuous mode according to the teachings of this invention. Briefly, prior to being fed into the reactor, solvent and monomers were purified to decrease their moisture content to a maximum of 8 ppm by flowing through a set of columns packed with alumina and molecular sieves. Purified solvent was then loaded into the reactor zone followed by the $1^{st}$ monomer feed. This reaction mixture was heated to the initial reaction temperature (Ti). As Ti was reached n-butyl lithium or other suitable initiator was added neat or in a suitable solvent solution to the reaction zone. The amount of initiator was stoichiometrically calculated to form individual blocks and/or final living anionically polymerized polymers with number average and weight average molecular weight TABLE 3a Living Anionically Polymerized Polymers

| | APP 9 | APP 10 | APP 11 | APP 12 | APP 13 |
|---|---|---|---|---|---|
| STY (%)[a] | 100 | 100 | 100 | 100 | 100 |
| sec-BuLi 1.54 M (%)[b] | 1.08 | 1.08 | 1.08 | 1.08 | 1.08 |
| BZ (%)[b] | 89.61 | 89.61 | 89.61 | 89.61 | 89.61 |
| Reactor Volume (liter) | 0.5 | 0.5 | 0.5 | 0.5 | 0.5 |
| Initial Reaction Temperature (° C.) | 25 | 25 | 25 | 25 | 25 |
| Final Reaction Temperature (° C.) | 25 | 25 | 25 | 25 | 25 |
| Residence Time (hours) | 17 | 17 | 17 | 17 | 17 |
| Target $M_n$ (g/mol) | 5,000 | 5,000 | 20,000 | 20,000 | 5,000 |
| Actual living APP $M_n$ (g/mol) | 5,240 | 4,849 | 25,810 | 23,750 | 5,380 |
| Type of APP | Linear PS | Linear PS | Linear PS | Linear PS | Linear PS |

In Table 3a, a = mole percent of monomer mixture and b = volume fraction of total reaction mixture.

TABLE 3b

Living Anionically Polymerized Polymers

| | APP 14 | APP 15 | APP 16 | APP 17 | APP 18 |
|---|---|---|---|---|---|
| STY (%)[a] | 100 | 100 | 100 | 100 | 100 |
| sec-BuLi 1.54 M (%)[b] | 1.08 | 1.08 | 1.08 | 1.08 | 1.08 |
| BZ (%)[b] | 89.61 | 89.61 | 89.61 | 89.61 | 89.61 |
| Reactor Volume (liter) | 0.5 | 0.5 | 0.5 | 0.5 | 0.5 |
| Initial Reaction Temperature (° C.) | 25 | 25 | 25 | 25 | 25 |
| Final Reaction Temperature (° C.) | 25 | 25 | 25 | 25 | 25 |
| Residence Time (hours) | 17 | 17 | 17 | 17 | 17 |
| Target $M_n$ (g/mol) | 20,000 | 20,000 | 5,000 | 5,000 | 5,000 |
| Actual living APP $M_n$ (g/mol) | 21,600 | 13,060 | 4,994 | 5,920 | 5,350 |
| Type of APP | Linear PS | Linear PS | Linear PS | Linear PS | Linear PS |

In Table 3b, a = mole percent of monomer mixture and b = volume fraction of total reaction mixture.

about a target value. The polymerization step was then allowed to proceed in either isothermal or quasi-adiabatic mode to a final temperature (Tf) and/or for a prescribed residence time (RTp). During the polymerization step sequential addition(s) of different monomers was carried out in a programmed batch or semi-batch mode depending on whether a homopolymer, random copolymer, block copolymer or tapered block copolymer was desired. At the end of this process living anionically polymerized polymer were obtained.

The specific synthesis conditions and APP characterization parameters are given in the Table 4 below. The abbreviations used below are defined as follows, STY=styrene, B=1,3 butadiene, n-BuLi=n-butyl lithium, and CH=cyclohexane.

or slow additions of the latter to a second reaction zone at Tm containing the functional oligomer solution, all favor the end-capping of the APP with the functional oligomer. Conversely, stoichiometric deficits of the functional oligomer versus the anion concentration, and slow additions of this oligomer to the reaction zone containing the living anionically polymerized polymer favor the coupling of living APP chains onto the functional oligomer. As the teachings of this invention show, in some instances, it is advantageous to modify only a portion of the living APP chains with oligomer. To this end a suitable partial termination agent (PTA) may be added to the living APP at the end of the polymerization stage and prior to the introduction of the functional oligomer to the

TABLE 4

Living Anionically Polymerized Polymers

| | Living Anionically Polymerized Polymers | | | | |
|---|---|---|---|---|---|
| | APP 19 | APP 20 | APP 21 | APP 22 | APP 23 |
| $1^{st}$ addition STY (%)$^a$ | 24 | 33 | 33 | 24 | 32 |
| TMEDA (%)$^a$ | 0.014 | 0.008 | 0.026 | 0.014 | 0.008 |
| $2^{nd}$ addition B (%)$^a$ | 76 | 67 | 67 | 76 | 68 |
| CH (%)$^b$ | 87 | 87 | 87 | 87 | 88 |
| Reactor Volume (liter) | 170 | 170 | 170 | 170 | 170 |
| $1^{st}$ Addition Initial Reaction Temperature (° C.) | 53 | 52 | 53 | 50 | 50 |
| $1^{st}$ Addition Final Reaction Temperature (° C.) | 59 | 59 | 63 | 55 | 57 |
| $2^{nd}$ Addition Final Reaction Temperature (° C.) | 108 | 99 | 102 | 102 | 95 |
| Target $1^{st}$ block $M_n$ (g/mol) | 9,000 | 12,000 | 18,000 | 9,000 | 12,000 |
| Target APP $M_n$ (g/mol) | 90,000 | 64,000 | 110,000 | 90,000 | 64,000 |
| Type of APP | Diblock SB | Diblock SB | Diblock SB | Diblock SB | Diblock SB |
| 1,2 Structures in B units or B block (%) | 17 | 15 | 13 | 19 | 15 |

In Table 4, a = weight % of total monomer mixture and b = weight % of total reaction mixture.

Preparation of Oligomer-Modified Anionically Polymerized Polymers I:

The living APPs described in Table 2 were modified with the functional oligomers O1 to O5 described in Table 1, according to the teachings of this invention, to form oligomer-modified anionically polymerized polymers (OMAPPs). Briefly, this anionically polymerized polymer modification step can be described as follows: at the end of the polymerization step a modification temperature (Tm) is set in the reaction zone. Once the reaction mixture containing the living anionically polymerized polymer attains Tm the oligomer is added to this reaction zone neat or in solution in a suitable solvent. The desired amount of the functional oligomer may be computed from the Mn of the living anionically polymerized polymer and the Fn of the functional oligomer. The amount of functional oligomer and the mode and temperature at which it is added to the reaction zone may be tailored to favor either end-capping or chain coupling of the living anionically polymerized polymer onto the functional oligomer. In some embodiments, a residence time less than 30 minues is required to carry out the end-capping or chain coupling reaction between the living anionically polymerized polymer and the functional oligomer.

As previously described, stoichiometric excesses of oligomer functionality over the anion (or lithium) concentration, and rapid additions of the functional oligomer to the reaction zone containing the living anionically polymerized polymer, reaction zone. The PTA can be added to the reaction zone neat or in a suitable solvent solution.

The stoichiometry of the PTA can be calculated to deactivate a given percent, always less than 100%, of living APP chains, thus allowing the functional oligomer modification of the remainder of living APP chains to occur subsequently. With or without partial termination, once this modification step is completed, an additional amount of a termination agent (TA) may be added to ensure that all living chains have been deactivated, thus allowing for the subsequent separation of the lithium from the oligomer-modified APP product. The TA can be the same as the PTA or different, and can be also a chemical compound that acts as an antioxidant or thermal stabilizer in the final OMAPP application. Optionally, other formulation compounds and additives can be added at this point. The oligomer-modified anionically polymerized polymer can be isolated from this reaction mixture by means of known separation and drying stages downstream of the reaction zone, as described previously.

The specific synthesis conditions used and OMAPP characterization parameters are given in the Table 5 below. The abbreviations used below are defined as follows, PTA=partial termination agent, TA=termination agent, CH=cyclohexane, OD=octadecanol, BHT=butyl hydroxyl toluene, and UX=Ultranox-877A.

TABLE 5

Oligomer-modified Anionically Polymerized Polymers

Oligomer-Modified APP

| | OMAPP 1 | OMAPP 2 | OMAPP 3 | OMAPP 4 | OMAPP 5 | OMAPP 6 | OMAPP 7 | OMAPP 8 |
|---|---|---|---|---|---|---|---|---|
| Living APP | APP1 | APP2 | APP3 | APP4 | APP5 | APP6 | APP7 | APP8 |
| PTA | — | OD | BHT | BHT | BHT | — | — | — |
| Functional Oligomer | O1 | O3 | O3 | O4 | O5 | O2 | O3 | O4 |
| TA | OD | BHT | BHT | BHT | BHT | OD | OD | OD |
| Other Additives | — | — | — | — | — | UX | UX | UX |
| Living APP (%)$^a$ | 95.52 | 95.98 | 99.33 | 99.39 | 98.26 | 99.36 | 99.31 | 99.30 |
| PTA (%)$^a$ | — | 0.20 | 0.26 | 0.20 | 0.52 | — | — | — |
| Functional Oligomer (%)$^a$ | 4.48 | 3.82 | 0.41 | 0.41 | 1.22 | 0.64 | 0.69 | 0.70 |
| TA (%)$^c$ | 0.42 | 0.14 | 0.11 | 0.30 | 0.03 | 0.27 | 0.35 | 0.07 |
| UX (%)$^c$ | — | — | — | — | — | 1.75 | 1.75 | 1.77 |
| CH in APP solution (%)$^b$ | 86.11 | 86.11 | 83.46 | 83.61 | 78.21 | 85.43 | 85.43 | 85.06 |
| CH in PTA solution (%)$^b$ | — | 95.00 | 70.00 | 70.00 | 80.00 | — | — | — |
| CH in Oligomer sol. (%)$^b$ | 80.00 | 90.00 | 90.00 | 90.00 | 85.00$^d$ | 60.00 | 90.00 | 90.00 |
| CH in TA solution (%)$^b$ | 95.00 | 70.00 | 70.00 | 70.00 | 70.00 | 95.00 | 95.00 | 95.00 |
| CH in UX solution (%)$^b$ | — | — | — | — | — | 70.00 | 70.00 | 70.00 |
| Mode of Modification | Coupling/end-capping | Coupling/end-capping | Coupling/end-capping | Coupling/end-capping | Coupling/end-capping | Coupling/end-capping | Coupling/end-capping | Coupling/end-capping |
| Modification Reaction Temp (° C.) | 73 | 100 | 103 | 100 | 79 | 98 | 102 | 115 |
| Partial termination (%) | 0 | 50 | 75 | 50 | 80 | 0 | 0 | 0 |
| Residence Time (min) | 3 | 3 | 3 | 3 | 6 | 15 | 15 | 3 |
| $M_p$ (linear fraction) g/mol | 96,817 | 109,122 | 114,961 | 111,112 | 81,161 | 64,000 | 61,000 | 64,700 |
| $M_p$ (coupled fraction) g/mol | 831,878 | 715,092 | 606,766 | 766,153 | 644,135 | 570,000 | 514,000 | 533,000 |
| PDI (Mw/Mn) | 2.94 | 2.31 | 1.23 | 1.65 | 1.40 | 3.21 | 3.20 | 3.0 |
| Coupled chains (%) | 41 | 32 | 7 | 22 | 11 | 44 | 45 | 46 |
| Average number of arms in coupled fraction | 8.6 | 6.6 | 5.3 | 6.9 | 7.9 | 8.9 | 8.4 | 8.2 |

In Table 5, a = weight % of reaction mixture, b = weight % of solution, c = weight % of product and d = 50:50 CH/THF solution.

In Table 5 and the other tables presented herein, $M_p$ is the molecular weight of the highest peak in a gel permeation chromatogram of the oligomer-modified anionically polymerized polymer.

Preparation of Oligomer-Modified Anionically Polymerized Polymers II:

The living APPs described in Tables 3a and 3b were modified with the functional oligomers O6 through O9 described in Table 1, according to the teachings of this invention, using the two reactor apparatus shown in FIG. 2 as follows: during the living polymerization taking place in the first reaction zone, a solution of the functional oligomer and distilled reaction solvent were prepared in the second reaction zone. The resulting solution was cooled to 0° C. with the aid of a chilling medium and blanketed with nitrogen. When end-capping of the living anionically polymerized polymer with the functional oligomer was sought, the contents of the first reaction zone were added over 2 to 4 minutes through the transfer line connecting the first and second reaction zones into the oligomer solution contained in the second reaction zone. When chain coupling of the living anionically polymerized polymer with the functional oligomer was sought, the oligomer solution in the second reaction zone was added over 2 to 4 minutes through the transfer line connecting the first and second reaction zones into the first reaction zone. In either case the modification reaction was then allowed to proceed for the prescribed residence time at the selected temperature. In these reactions no partial termination was employed and all reactions were quenched with degassed methanol at the end of the modification reaction. The resulting oligomer-modified anionically polymerized polymer was then isolated in the given reactor or downstream through vacuum evaporation of the solvent.

The specific synthesis conditions used and OMAPP characterization parameters are given in the Tables 6a and 6b below. The abbreviations used below are defined as follows, TA=termination agent, BZ=benzene, and MeOH=methanol.

TABLE 6a

Oligomer-modified Anionically Polymerized Polymers

| | Oligomer-Modified APP | | | | |
|---|---|---|---|---|---|
| | OMAPP 9 | OMAPP 10 | OMAPP 11 | OMAPP 12 | OMAPP 13 |
| Living APP | APP9 | APP10 | APP11 | APP12 | APP13 |
| Functional Oligomer | O6 | O7 | O7 | O8 | O9 |
| TA | MeOH | MeOH | MeOH | MeOH | MeOH |
| Living APP (%)[a] | 72.4 | 71.3 | 90.9 | 94.8 | 94.6 |
| Functional Oligomer (%)[a] | 27.6 | 28.7 | 9.1 | 5.2 | 5.4 |
| TA (%)[c] | 5 | 5 | 5 | 5 | 5 |
| BZ in APP solution (%)[b] | 89.61 | 89.61 | 89.61 | 89.61 | 89.61 |
| BZ in Oligomer sol. (%)[d] | 75.0 | 75.0 | 75.0 | 75.0 | 75.0 |
| Mode of Modification | coupling | coupling | coupling | capping | coupling |
| Modification Reaction Temp (° C.) | 25 | 25 | 25 | 25 | 25 |
| Residence Time (hours) | 24 | 24 | 24 | 24 | 24 |
| $M_p$ (linear APP) (g/mol) | 5,280 | 4,905 | 25,600 | 23,540 | 5,630 |
| $M_p$ (coupled OMAPP) (g/mol) | 36,900 | 49,180 | 80,370 | 84,050 | 78,800 |
| Mw (coupled OMAPP) (g/mol) | 34,600 | 36,130 | 110,400 | 67,840 | 51,300 |
| PDI (Mw/Mn) | 3.48 | 4.29 | 2.75 | 3.19 | 4.84 |
| Coupled chains (%) | 78 | 69 | 56 | 73 | 70 |
| Average number of arms in coupled fraction | 7.0 | 10.0 | 3.1 | 3.6 | 14.0 |

In Table 6a, a = weight % of reaction mixture, b = volume fraction of polymerization solution, c = weight % of product and d = weight percent in oligomer solution.

TABLE 6b

Oligomer-modified Anionically Polymerized Polymers

| | Oligomer-Modified APP | | | | |
|---|---|---|---|---|---|
| | OMAPP 14 | OMAPP 15 | OMAPP 16 | OMAPP 17 | OMAPP 18 |
| Living APP | APP14 | APP15 | APP16 | APP17 | APP18 |
| Functional Oligomer | O7 | O8 | O7 | O6 | O9 |
| TA | MeOH | MeOH | MeOH | MeOH | MeOH |
| Living APP (%)[a] | 89.1 | 94.8 | 67.0 | 67.0 | 66.7 |
| Functional Oligomer (%)[a] | 10.9 | 5.2 | 33.0 | 33.0 | 33.3 |
| TA (%)[c] | 5 | 5 | 5 | 5 | 5 |
| BZ in APP solution (%)[b] | 89.61 | 89.61 | 89.61 | 89.61 | 89.61 |
| BZ in Oligomer sol. (%)[d] | 75.0 | 75.0 | 75.0 | 75.0 | 75.0 |
| Mode of Modification | end-capping | coupling | end-capping | end-capping | end-capping |
| Modification Reaction Temp (° C.) | 25 | 25 | 25 | 25 | 25 |
| Residence Time (hours) | 24 | 24 | 24 | 24 | 24 |
| $M_p$ (linear APP) (g/mol) | 21,400 | 13,150 | 5,053 | 6,160 | 5,400 |
| $M_p$ (coupled OMAPP) (g/mol) | 32,030 | 107,400 | 14,350 | 34,700 | 6,490 |
| Mw (coupled OMAPP) (g/mol) | 60,610 | 90,460 | 27,200 | 30,100 | 24,100 |
| PDI (Mw/Mn) | 3.00 | 8.35 | 3.09 | 3.13 | 3.95 |
| Coupled chains (%) | 50 | 79 | 65 | 66 | 51 |
| Average number of arms in coupled fraction | 1.5 | 8.2 | 2.8 | 5.6 | 1.2 |

In Table 6b, a = weight % of reaction mixture, b = volume fraction of polymerization solution, c = weight % of product and d = weight percent in oligomer solution.

Preparation of Oligomer-Modified Anionically Polymerized Polymers III:

The living APPs described in Table 4 were modified with the functional oligomers O11, O12, and O14 described in Table 1, according to the teachings of this invention, to form OMAPP. The process employed in these experiments was the same as that used to produce the OMAPPs reported in Table 5.

The specific synthesis conditions used and OMAPP characterization parameters are given in the Table 7 below. The abbreviations used below are defined as follows: CH=cyclohexane, OD=octadecanol, BHT=butyl hydroxyl toluene, and UX=Ultranox-877A.

reached, 3.5 parts of the oligomer-modified anionically polymerized polymer were added to the asphalt at a rate of 2 grams/minute. The agitation was maintained for 55 to 100 minutes for the effective and total dispersion of the OMAPP acting as reinforcing agent. To ensure that the same level of dispersion was achieved in all formulations, the OMAPP dispersion in asphalt was monitored through fluorescence microscopy using an Olympus microscope with filters around 350 to 480 nm.

The asphalt formulations thus obtained were characterized against the AC-20 unmodified asphalt control by RBSP according to ASTM D36. Penetration (PI) was measured per ASTM D5 at 25° C., 10 seconds and 100 grams using a

TABLE 7

Oligomer-modified Anionically Polymerized Polymers

Oligomer-modified APF

|  | OMAPP 19 | OMAPP 20 | OMAPP 21 | OMAPP 22 | OMAPP 23 |
|---|---|---|---|---|---|
| Living APP | APP19 | APP20 | APP21 | APP22 | APP23 |
| PTA | — | — | — | — | — |
| Functional Oligomer | O10 | O11 | O12 | O13 | O14 |
| TA | BHT | BHT | BHT | BHT | BHT |
| Other Additives | — | — | — | — | — |
| Living APP (%)$^a$ | 96.50 | 99.48 | 98.18 | 96.00 | 97.92 |
| PTA (%)$^a$ | — | — | — | — | — |
| Functional Oligomer (%)$^a$ | 3.50 | 0.52 | 1.82 | 4.00 | 2.08 |
| TA (%)$^c$ | 0.7 | 0.7 | 0.7 | 0.7 | 0.7 |
| UX (%)$^c$ | — | — | — | — | — |
| CH in APP solution (%)$^b$ | 87 | 87 | 87 | 87 | 88 |
| CH in PTA solution (%)$^b$ | — | — | — | — | — |
| CH in Oligomer sol. (%)$^b$ | 10$^e$ | 30 | 30$^e$ | 10$^e$ | 30 |
| CH in TA solution (%)$^b$ | 70 | 70 | 70 | 70 | 70 |
| CH in UX solution (%)$^b$ | — | — | — | — | — |
| Mode of Modification | End-capping | Coupling | Coupling | End-capping | Coupling |
| Modification Reaction Temp (° C.) | 105 | 95 | 98 | 100 | 91 |
| Partial termination (%) | 0 | 0 | 0 | 0 | 0 |
| Residence Time (min) | 5 | 5 | 5 | 5 | 5 |
| $M_p$ (linear fraction) (g/mol) | 98,807 | 67,319 | 101,872 | 85,343 | 65,118 |
| $M_p$ (coupled fraction) (g/mol) | 596,505 | 551,678 | 937,598 | 596,800 | 648,165 |
| PDI (Mw/Mn) | 2.27 | 3.07 | 3.87 | 2.88 | 3.18 |
| Coupled chains (%) | 43 | 57 | 49 | 43 | 59 |
| Average number of arms in coupled fraction | 6.0 | 8.2 | 9.2 | 6.3 | 10 |

In Table 7, a = weight % of reaction mixture, b = weight % of solution, c = weight % of product, d = 50:50 CH/THF solution and e = THF solution.

Example 2

Applications in Polymer Reinforced Asphalt for Road Paving

Dry, gel-free oligomer-modified anionically polymerized polymers, OMAPP-1 to 5 and 7 (Table 5), prepared as described in Example 1, were used as asphalt modifiers or asphalt reinforcing agents in road paving formulations. To this end, AC-20 asphalt (PG-64-22) was formulated by a hot-mix process. In this process a high-shear mixer configured as rotor-stator (Euromix 33/300P) was employed. First 96.5 parts of AC-20 asphalt were heated without agitation to 120° C. to soften the asphalt under a nitrogen atmosphere. During this stage very slow agitation was employed to prevent asphalt overheating and oxidation. Once the asphalt was soft, heating continued to 185° C.+/−5° C. and the mixer agitation was increased to 2000 RPM. As 185° C. was Humboldt model H1200 Penetrometer. Maximum application temperature ("Max use T") was measured as the temperature at which the Ruting Factor or Dynamic Shear Stiffness G*/sin δ takes the value of 1.0 KPa, where G* is the complex modulus and δ is the phase angle as measured per AASHTO TP5. Morphology stability or phase segregation was measured as per ASTM D5976 as the percent difference between the RBSP (measure as per ASTM D36) at the top and bottom sections of a cylindrical probe, made in the interior of a sealed tube containing the formulated asphalt, and aged at 163° C. for 48 hours in vertical position without agitation. The values obtained for the properties in the upper and lower sections are used as follows to calculate the percent of phase separation:

1) % Separation Δ(RBSP)

Δ(RBSP)=highest RBSP value lowest RBSP value

% separation$_{RBSP}$=(Δ(RBSP)/highest RBSP value) *100

Results are given in Table 8 below and show the enhanced performance of the OMAPP reinforced asphalts.

TABLE 8

Performance of OMAPP in Asphalt Reinforcement for Road Paving

| Asphalt | Modifier | Modifier (%) | RBSP (° C.) | PI @ 25° C. (mm/10) | Max use T G*/sinδ = 1 KPa (° C.) | Phase Separation (%) |
|---|---|---|---|---|---|---|
| AC-20 | — | 0.0 | 44 | 69 | 70 | — |
| AC-20 | APP-1 | 3.5 | 52 | 55 | 80 | 18.7 |
| AC-20 | OMAPP-1 | 3.5 | 52 | 55 | 84 | 0.0 |
| AC-20 | OMAPP-2 | 3.5 | 54 | 54 | 82 | 0.0 |
| AC-20 | OMAPP-3 | 3.5 | 62 | 35 | 87 | 1.5 |
| AC-20 | OMAPP-4 | 3.5 | 60 | 55 | 84 | 1.6 |
| AC-20 | OMAPP-5 | 3.5 | 58 | 45 | 86 | 0.0 |
| AC-20 | OMAPP-7 | 3.5 | 62 | 35 | 88 | 0.1 |

Reviewing Table 8, we can see a marked difference between the values of the properties measured for the neat AC-20 (PG 64-22) asphalt and for the control-modified asphalt APP-1. Specifically, the asphalts modified with OMAPP-3 and 7 demonstrate a noticeably higher softening temperature, lower penetration, and a lower percentage of separation compared to the asphalt modified with the control.

Fluorescence microscopy images were obtained from reinforced asphalts with APP-1 (control), and with OMAPP-1 to 5, and 7 using an Olympus optical microscope with a fluorescence source and 380-480 filters to observe the morphology of both polymer-rich phase and asphalt-rich phase. FIG. 3 shows the fluorescence micrograph of the control system and FIG. 4 shows the fluorescence micrograph of the OMAPP-3 modified asphalt. The polymer-rich phase is observed as the brighter regions and asphalt rich phase as the darker regions. Micrographs were taken at a magnification of 1000×. As an illustrative example, a qualitative comparison of the fluorescent microscopy images for APP-1 and OMAPP-3 revealed that the polymer particles in OMAPP-3 were smaller than those in APP-1. This reduction in particle size is evidence of enhanced compatibility with asphalt, in agreement with the findings of L. H. Lewandoski (1994), Rubber Chemistry and Technology, Rubber Reviews, Vol. 67, No. 3, pp. 447-480.

Example 3

Applications in Polymer Reinforced Asphalt for Roofing and Waterproof CoatingsDry, gel-free oligomer-modified anionically polymerized polymers, OMAPP-2, 3 and 5 (Table 5), prepared in Example 1, were used as asphalt modifiers or asphalt reinforcing agents for Roofing and Waterproof Coatings applications. To this end, 89 parts of AC-20 asphalt (PG-64-22) were formulated with 11 parts of the oligomer-modified anionically polymerized polymer, by a hot-mix process following the procedure and testing methods described in Example 2. Results are given in Table 9 below and show the enhanced performance of the OMAPP reinforced asphalts against unmodified controls.

TABLE 9

Performance of OMAPP in Asphalt Reinforcement for Roofing and Waterproof Coatings

| Asphalt | Modifier | Modifier (%) | RBSP (° C.) | Pen @ 25° C. (mm/10) | Max use T G*/sinδ = 1 KPa (° C.) | Phase Separation (%) |
|---|---|---|---|---|---|---|
| AC-20 | — | 0.0 | 44 | 69 | 70 | — |
| AC-20 | APP-1 | 11.0 | 64 | 91 | 102 | 22.0 |
| AC-20 | OMAPP-2 | 11.0 | 64 | 70 | 104 | 8.5 |
| AC-20 | OMAPP-3 | 11.0 | 63 | 73 | 104 | 21.6 |

Reviewing Table 9, we can see some marked differences between the values of the properties measured for the APP-1 modified asphalt (control) and the OMAPP-2 modified asphalt. Specifically, the asphalts modified with OMAPP-2 and 3 demonstrate a noticeably lower penetration at 25° C. and lower percentage of separation.

Fluorescence microscopy images were obtained as in Example 2. A qualitative comparison of the fluorescent microscopy images for APP-1 (see FIG. 5) and OMAPP-3 (see FIG. 6) revealed that the asphalt particles in OMAPP-3 were more defined and smaller than those in APP-1. This reduction in particle size is also evidence of enhanced compatibility with asphalt.

Example 4

Applications in Pressure Sensitive Adhesives, Hot Melt Adhesives and Hot-Melt Pressure Sensitive Adhesives Dry, gel-free oligomer-modified anionically polymerized polymers, OMAPP-6, 7 and 8 (Table 5), prepared in Example 1, were used in pressure sensitive adhesive (PSA) and hot-melt adhesive (HMA) formulations. The adhesive formulation were prepared by mixing at 180° C. in a propeller mixer operating at 300 RPM, 18 to 25% by weight of a naphtenic plasticizer such as SHELLFLEX 371, with 45 to 60% by weight of a combination of tackifiers such as Permalyn 3100 (rosin ester of pentaerithritol, RBSP=100°), Sylvatac RE100 (Rosin ester, RBSP=100° C.), Eastotac H130 (C5 hydrogenated hydrocarbon resin, RBSP=130° C.), Sylvares TR1115 (polyterpene resin, RBSP=115° C.), Sylvares ZT105LT (terpene/styrenic resin, RBSP=105° C.) and Sylvares TP2040 (terpene/phenolic resin, RBSP=118° C.) The blend was maintained until a good dispersion of the components was achieved. Then 0.5 to 2.0% by weight of an antioxidant such as Irganox-1076 or Ultranox 877 was added to the mix, followed by 20 to 25% by weight of the oligomer-modified anionically polymerized polymer. The mix was left to achieve homogeneity and then the resulting adhesive was cooled to room temperature.

The performance of the adhesive formulations was evaluated through shear, tensile, and Brookfield viscosity tests. Shear tests were conducted according to ASTM D3654 at 23° C. using stainless steel probes as substrates and a weight of 500 g. The result was measured as the shear resistance that is proportional to take the adhesive off from the substrate and is expressed as time to fail in days. Tensile tests were measured as per a modified ASTM D3759. In this method, 10 cm long and 1 cm² cross-section probes of the adhesive formulations were employed. The probes were subjected to a tensile test in an universal mechanical tester Zwick model 1445 at a constant strain rate of 508 mm/minute until the probe was broken, and the results report the tensile strength (resistance to break) of the adhesive formulation. Brookfield viscosities of the adhesive formulations were measured at 150° C. according to ASTM D1084. Adhesive formulations and evaluation results are shown below in Table 10 against an unmodified control.

TABLE 10

Performance of OMAPP in Pressure Sensitive Adhesives

| | PSA Formulation (% w/w) | | | | | |
|---|---|---|---|---|---|---|
| | A | B | C | D | E | F |
| Control APP-6 | 22.0 | — | — | — | — | — |
| OMAPP-6 | — | 22.0 | — | — | 22.0 | — |

TABLE 10-continued

Performance of OMAPP in Pressure Sensitive Adhesives

| | PSA Formulation (% w/w) | | | | | |
|---|---|---|---|---|---|---|
| | A | B | C | D | E | F |
| OMAPP-7 | — | — | 22.0 | — | — | 22.7 |
| OMAPP-8 | — | — | — | 22.0 | — | — |
| Permalyn 3100 | 12 | 12.0 | 12.0 | 12.0 | 12.0 | — |
| Sylvatac RE100 | 10 | 10.0 | 10.0 | 10.0 | — | 18.9 |
| Eastotac H130 | 35 | 35.0 | 35.0 | 35.0 | — | — |
| Sylvares TR1115 | — | — | — | — | 35.0 | 29.2 |
| Sylvares ZT105LT | — | — | — | — | 10.0 | — |
| Sylvares TP2040 | — | — | — | — | — | 4.7 |
| Shellflex 371 | 371 | 20.0 | 20.0 | 20.0 | 20.0 | 22.7 |
| Irganox 1076 | 1.0 | 1.0 | 1.0 | 1.0 | 1.0 | 1.8 |
| Ultranox 877 | — | 1.0 | — | — | — | 1.8 |
| PSA Performance | | | | | | |
| Brookfield Viscosity (P @ 150° C.) | 55 | 23.0 | 29.0 | 34.0 | 27.0 | 46.0 |
| Tensile Strength (Kg/cm²) | 4.2 | 7.2 | 5.9 | 6.8 | 6.8 | 7.6 |
| Shear Strength (days) | 13 | 31 | 15 | 21 | 28 | 100 |

Example 5

Preparation of Rheology Enhanced Plastic Compositions

Oligomer-modified anionically polymerized polystyrene bearing multi-arm structures were prepared in Example 1 (Table 6). From these, OMAPP-12 through 15 were chosen for rheology evaluation (Mw ranging from 50,000 to 95,000). The melt rheology of OMAPP-12 through 15 was measured and compared to two linear PS controls bearing similar molecular weights (Mw). The melt rheology of these materials were measured using a parallel plate viscometer (Rheoletric Scientific SR5000) under a shear rate sweep between 125 and 200° C. Comparative results, consisting of viscosity at 1/sec and 100/sec shear rates and Theological ratio defined as the ratio of the viscosity at 1/100 sec to 1/sec, are shown below in Table 11.

TABLE 11

Enhanced Rheology of OMAP-PS

| PS Compound | Mp (g/mol) | Mw (g/mol) | PDI (Mw/Mn) | Structure | Viscosity at 0.01 s⁻¹ @ 150° C. (poise) | Viscosity at 4.0 s⁻¹ @ 150° C. (poise) | Rheol. Ratio = Visc. at 0.01 s⁻¹:Visc. at 4.0 s⁻¹ |
|---|---|---|---|---|---|---|---|
| PS control A | 903 | 32,840 | 21.40 | Linear Blend | 1,035 | 923 | 1.12 |
| PS Control B | 123,720 | 196,940 | 2.67 | Linear | 12,884 | 10,127 | 1.27 |
| OMAPP-12 | 84,050 | 67,840 | 3.19 | Multi-arm radial | 11,822 | 5,438 | 2.17 |
| OMAPP-13 | 78,800 | 51,300 | 4.84 | Multi-arm radial | 2,108 | 435 | 4.85 |
| OMAPP-14 | 32,030 | 60,610 | 3.00 | Multi-arm radial | 6,166 | 1,100 | 5.61 |
| OMAPP-15 | 107,740 | 90,460 | 8.35 | Multi-arm radial | 10,124 | 3,624 | 2.79 |

Example 6

Applications in Flow Modifcation or Rheology Control of Plastics and Engineering Thermoplastics Given their outstanding rheological characteristics, oligomer-modified anionically polymerized polymers bearing a multi-arm structures OMAPP-9, 10, and 11 prepared in Example 1 (Table 6) were evaluated as flow modifiers, process aids, or rheology control agents for plastics and engineering thermoplastics. To this end, 4 parts of the oligomer-modified anionically polymerized polymers were melt blended with 96 parts polyamide-6 (Ultramid B3, BASF), polybutylene terephthalate (Valox 325, GEP), and Polycarbonate (Lexan 131, GEP) at a prescribed temperature and residence time, in a 64 cc Brabender mixing bowl operating at 50 RPM. The compounds thus obtained were grinded into small pellets, and their Melt Flow Indices (MFI) were characterized in a Plastometer (Tinius Olsen PPDT-600) according to ASTM D 1238, and their Tg was established through DSC (TA Insturments 2910 and 2020) as per ASTM D 3417 and D3418 to assess effects on thermal properties of the compounds. The Polycarbonate compounds were additionally characterized with a Waters 510 GPC, using a differential refractometer detector, THF mobile phase, and a flow rate of 1.0 ml/min, maintained at 40° C. to verify the stability of the modified thermoplastics during compounding with the OMAPP. The results showing the outstanding changes in MFI of the engineering thermoplastic compounds compared to the unmodified controls with similar thermal history are shown below in Table 12.

TABLE 12

| Compound (% w/w) | Flow Modification and Rheology Control of Engineering Thermoplastics. | | | | | |
|---|---|---|---|---|---|---|
| | 6a | 6b | 6c | 6d | 6e | 6f |
| PA-6 | 100 | 96 | — | — | — | — |
| PC | — | — | 100 | 96 | — | — |
| PBT | — | — | — | — | 100 | 96 |
| OMAPP-9 | — | — | — | — | — | 4 |
| OMAPP-10 | — | 4 | — | — | — | — |
| OMAPP-11 | — | — | — | 4 | — | — |
| Blend T (° C.) | 270 | 270 | 270 | 270 | 270 | 270 |
| Mixing RPM | 50 | 50 | 50 | 50 | 50 | 50 |
| Residence Time (min) | 3 | 3 | 3 | 3 | 3 | 3 |
| MFI (g/10") | 26.0 | 44 | 6.2 | 9.5 | 17.0 | 22 |
| Change MFI vs Control (%) | — | 69 | — | 53 | — | 29 |
| Tg (° C.) | 49 | 51 | 154 | 152 | 43 | 38 |
| Mn (g/mol) | — | — | 16,920 | 18,147 | — | — |
| Mw (g/mol) | — | — | 60,554 | 54,804 | — | — |

Example 7

Applications in Surface Energy Modification and Surface Adhesion Enhancement of Thermoplastics Oligomer-modified anionically polymerized polymers bearing substantial amounts of (meth)acrylate containing functional oligomers have shown enhanced surface energy and improved adhesion to polar substrates. Dried OMAPP-16, 17, and 18, were characterized in their surface energy using a FibroDat contact angle instrument. Their adhesion characteristics were evaluated over aluminum against a commercial PS controls. Comparative results, are shown below in Table 13.

TABLE 13

Enhanced Surface Energy and Adhesion to Polar Substrates of OMAPPs

| PS Compound | Solubility parameter | Contact Angle | Surface Energy (mJ/M²) | Adhesion to Aluminum | Konig Hardness (sec) |
|---|---|---|---|---|---|
| PS control | 19.26 | 87.60 | 32.22 | 2 | 120 |
| OMAPP-16 | 18.69 | 86.84 | 32.68 | 2 | 240 |
| OMAPP-17 | 18.54 | 88.87 | 31.46 | 1 | 41 |
| OMAPP-18 | 19.24 | 85.75 | 33.34 | 5 | 205 |

Example 8

Applications in Impact Modification of Plastics and Engineering Thermoplastics Oligomer-modified anionically polymerized polymers OMAPP-19, 20, and 21 were prepared as described in Example 1 (Table 7). These oligomer-modified anionically polymerized polymers were selected for impact modification of several plastics and engineering thermoplastics due to the small solubility parameter difference between the functional oligomer employed in their preparation (Table 1) and these plastics.

Impact modified plastics formulations consisting of 90 to 95 parts of a plastic chosen from the families of polyamides (PA), particularly PA-6, PA-6,6, PA-12, polyesters (PEs), particularly PET and PBT, polycarbonates (PC), PS, PS copolymers, SAN, ABS, PC/ABS, HIPS, PPE, PPE/PS, PPE/PA, PA/ABS, PC/ABS, PEI, PEK, PEEK, PSu, POM, TPU, and the like, were dry-blended, co-fed or separate fed with 5 to 10 parts of OMAPP. These formulations were compounded in a 25 mm Werner & Pfleiderer co-rotating twin screw extruder (L/D=24) or a CW Brabender 15 mm co-rotating conical twin screw extruder, operating under a prescribed RPM, temperature profile, and residence time. The resulting impact modified plastic compounds were injection molded into standard ASTM probes in a Battenfeld 39 ultraplus injection molding machine with 40 ton of nominal clamping pressure, injection conditions were set in agreement with the recommendations for the plastics employed. The compounded pellets were characterized by MFI, and the injection molded probes were characterized by Tensile Mechanical Testing, HDT, and Notched Izod Impact techniques according to ASTM D1238, D638 & D256, respectively. Results are given in Table 14 below and show the enhanced impact performance of the OMAPP over the unmodified plastic and engineering thermoplastic and against other suitable impact modifier controls.

TABLE 14

Applications of OMAPP in Impact Modification of Plastics and Engineering Thermoplastics

| Plastic Compound | MFI (g/10") | Tensile Modulus (KPSI) | Elongation @ break (%) | Notched Izod Impact in 3.2 mm (lb-ft/in) | HDT (° C.) |
|---|---|---|---|---|---|
| NAS 21[a] | 10.7 | 270.9 | 3.0 | 0.36 | 75.8 |
| NAS 21 + 7% OMAPP-19 | 8.1 | 267.1 | 8.1 | 0.69 | 76.5 |
| NAS 21 + 7% OMAPP-20 | 7.3 | 247.2 | 7.8 | 0.74 | 74.2 |
| NAS 21 + 7% Control 1 | 4.2 | 257.6 | 8.4 | 0.83 | 73.6 |
| NAS 21 + 7% Control 2 | 6.6 | 250.3 | 3.9 | 0.79 | 75.4 |
| Magnum 545-7[b] | 7.0 | 193.3 | 13.7 | 6.91 | 72.6 |
| Magnum 545-7 + 7% OMAPP-19 | 6.7 | 178.0 | 32.2 | 6.55 | 71.5 |
| Magnum 545-7 + 7% OMAPP-20 | 6.2 | 177.5 | 36.6 | 6.51 | 71.6 |
| Magnum 545-7 + 7% Control 1 | 7.1 | 177.6 | 36.2 | 6.58 | 70.5 |
| Crystal 3100[c] | 46.3 | 269.0 | 2.1 | 0.33 | 72.2 |
| Crystal 3100 + 7% OMAPP-19 | 19.8 | 253.3 | 14.3 | 0.70 | 72.5 |
| CPS 3100 + 7% OMAPP-20 | 20.9 | 254.0 | 16.5 | 0.90 | 72.3 |
| CPS + 7% Control 1 | 12.9 | 247.1 | 19.8 | 0.83 | 72.7 |
| Lexan 141[d] | 16.1 | 177.2 | 99.7 | 15.30 | 115.1 |
| Lexan 141 + 7% OMAPP 21 | 14.2 | 197.6 | 107.4 | 23.63 | 117.9 |
| Lexan 141 + 7% Control 3 | 49.8 | 189.7 | 67.74 | 14.67 | 112.3 |
| Zytel 7301[e] | 30.1 | 270.9 | 3.0 | 0.93 | 47.7 |
| Zytel 7301 +7% OMAPP 21 | 23.2 | 250.3 | 3.9 | 0.80 | 50.5 |
| Zytel 7301 + 7% Control 3 | 23.9 | 257.6 | 8.4 | 0.86 | 49.1 |
| Valox 325[f] | 21.4 | 210.0 | 16.8 | 0.91 | 45.7 |
| Valox 325 + 7% OMAPP 21 | 17.7 | 189.2 | 20.8 | 0.93 | 45.5 |
| Valox 325 + 7% Control 3 | 15.2 | 188.5 | 18.8 | 1.18 | 45.8 |

In Table 14, a) NAS 21: Styrene copolymer obtained from the Nova Chemical Company, b) Magnum 545-7: ABS obtained from the Dow Chemical Company, c) Crystal 3100: Crystal polystyrene obtained from the Nova Chemical Company, d) Lexan 141: Polycarbonate obtained from General Electric Plastics, e) Zytel 7301: Polyamide 6 obtained from DuPont Chemical Company, f) Valox 325: PBT obtained from General Electric Plastics.

Example 9

Enhancement of Thermoplastic Elastomer Properties for Soft Touch and Injection Molding Applications Oligomer-modified anionically polymerized polymers OMAPP-19 & 21, were prepared as described in Example 1 (Table 7). These oligomer-modified anionically polymerized polymers were selected to demonstrate the enhanced thermoplastic elastomer (TPE) properties of OMAPP over their unmodified APP counterparts. Soft touch and injection molding TPE formulations consisting of 70 to 100 parts of OMAPP and 0 to 30 parts of naphthenic, parafinic, or aliphatic oil additives and 0 to 2 parts heat stabilizers were made. These formulations were compression molded into ASTM probes as described in Example 8. The resulting TPE compositions were characterized by Shore A Hardness and Tensile Mechanical Testing according to ASTM D2240 and D412, respectively. Results are given in Table 15.

TABLE 15

Enhanced Performance of OMAPP as TPE for Soft Touch and Injection Molding Applications

| Plastic Compound | % Oil Additive | % Iganox 1010 | Shore A Hardness | Tensile Strength @ 100% Strain (PSI) | Tensile Strength @ 200% Strain (PSI) |
|---|---|---|---|---|---|
| Control TPE | 0.0 | 0.0 | 84 | 248.3 | 263.3 |
| Control TPE | 15.0 | 0.7 | 65 | 211.3 | 238.8 |
| OMAPP-19 | 15.0 | 0.7 | 62 | 116.3 | 141.3 |
| OMAPP-21 | 15.0 | 0.7 | 62 | 148.8 | 167.5 |
| Control TPE | 20.0 | 0.7 | 65 | 164.0 | 186.0 |
| OMAPP-19 | 20.0 | 0.7 | 58 | 100.4 | 116.8 |
| OMAPP-21 | 20.0 | 0.7 | 55 | 125.8 | 148.0 |

Example 10

Polymer Blends for Use as Asphalt Compatibilizers

Production of a First Polymer Blend (PB1):

An 80-liter stainless steel reactor was loaded with 50.4 kg of cyclohexane and a total of 8 kg of: i) styrene monomer and ii) butadiene monomer, at a weight ratio of 0.33 (styrene to butadiene). Both the solvent (cyclohexane) and the monomers were purified in advance to reduce humidity content. An anionic polymerization reaction was initiated at 50° C. by adding 0.12 moles of 0.3 M n-butyllithium, plus a slight excess to eliminate poisons in the reactor system. After the reaction temperature peaked, anionic polymerization residence time was 20 minutes, producing a styrene-butadiene anionically polymerized polymer with living chains. Immediately following this, a partial termination reaction was performed, adding 0.0705 kg of a butyl hydroxy toluene (BHT) solution at a concentration of 30% by weight in cyclohexane.

The partial termination continued until the temperature was adiabatically reduced to 100° C. Subsequently, an oligomer coupling reaction was performed, adding 0.324 kg of an oligomer containing styrene, 2-ethyl-hexyl acrylate, and glycidyl methacrylate dissolved in cyclohexane at a concentration of 10% by weight. The residence time for this reaction was 3 minutes. A specified number of the living styrene-butadiene anionically polymerized chains remaining after the partial termination stage were thus coupled to each molecule of the oligomer added. Finally, the entire reaction mixture was terminated by adding 0.03 kg of a butyl hydroxy toluene solution at a concentration of 30% by weight. This terminated any living linear styrene-butadiene anionically polymerized polymer chains and any living oligomer-modified anionically polymerized polymers, producing a composition of linear anionically polymerized polymers and radial oligomer-modified anionically polymerized polymers.

The resulting polymer blend was coagulated and dried and characterized by gel permeation chromatography (GPC). The highest peak in the chromatogram, corresponded to the linear anionically polymerized polymer, had an average molecular weight (designated "Mp") of 109,122 g/mol and a polydispersity of 1.1. Quantitative analysis of this chromatogram revealed that the composition also contains a broad distribution of radial oligomer-modified anionically polymerized polymers.

Based on the broad distribution seen in the chromatogram, it was determined that the radial structures contain a family of molecules having a variable number of polymer chains coupled to the oligomer, typically forming radial structures containing from 3 to 18 branches, with an oligomer core.

Three additional polymer blends (PB2 PB4) were produced using the same procedure described above. For each composition, the level of partial termination and/or the quantity of polar random oligomer added was varied.

Preparation of Control:

A styrene-butadiene anionically polymerized polymer was synthesized in parallel according to the procedure described above, but without partial termination, partial coupling, or oligomer modification (Control). The resulting anionically polymerized polymer contained a styrene to butadiene weight ratio of 0.33. This anionically polymerized polymer is commonly used in the prior art as an asphalt modifier.

Table 16 shows the average molecular weight of the linear anionically polymerized polymer in each blend, the extent of partial termination and oligomer modification in each blend, the degree of branching for the oligomer-modified anionically polymerized polymers in each blend and the weight percent of oligomer-modified anionically polymerized polymer in each blend.

TABLE 16

|  | PB1 | PB2 | PB3 | PB4 | Control |
|---|---|---|---|---|---|
| Mp of linear APP | 109,122 | 108,227 | 101,280 | 114,961 | 110,000 |
| Partial Termination Reaction |  |  |  |  |  |
| % terminated | 50 | 80 | 80 | 80 | 0 |
| Oligomer Modification |  |  |  |  |  |
| Molar Ratio: Oligomer/Linear APP | 1 | 0.1 | 1 | 0.1 | 0 |
| Branching of OMAPP: |  |  |  |  |  |
| # branches/oligomer molecule | 3-18 | — | 3-14 | 3-7 | 0 |
| OMAPP in blend, wt % | 29 | — | 21 | 3 | 0 |

Modification of Asphalt with Polymer Blends:

Each polymer blend (PB1-PB4) and the control was mixed with an asphalt produced at the AC-20 refinery in Salamanca, Mexico. The properties of this asphalt are shown in Table 17:

TABLE 17

| Asphalt Characteristics | |
|---|---|
| Ring & Ball Softening Point (RBSP) | 44° C. |
| Penetration | 69 mm |
| Asphaltenes | 21% |
| PG (AASHTO Performance Grade) | 64-22 |

More specifically, for each polymer blend (i.e., compatibilizer) and the control, three modified asphalts were obtained, containing concentrations of 3.5%, 7%, and 11% of compatibilizer by weight. The procedure for producing compatibilizer/asphalt mixtures began with addition of polymer blends to the asphalt at 185° C., ±5° C., using a heavy-duty shearing mixer at high agitation speed. Mixing time depends on polymer type; however, for purposes of comparison, it was set at 100 minutes.

The compatibility of the modified asphalts (MA1 MA15) was evaluated using the tube phase separation test, as specified in ASTM Standard D5976. In this test, the hot compatibilizer/asphalt mix is placed in a metal tube 2 cm in diameter and 12 cm in height, then stored in a 160° C. oven for 48 hours, followed by sudden cooling. The tube is cut into three equal sections, and the physical properties (softening point and penetration) and flow properties (modules or loss angle) of the upper and lower sections are examined.

The values obtained for the properties in the upper and lower sections are used as follows to calculate separation:
1) % Separation Δ(RBSP)

$\Delta(RBSP) = $ highest $RBSP$ value lowest $RBSP$ value

% separation$_{RBSP}$=(Δ(RBSP)/highest $RBSP$ value) *100

The difference in loss angle (Δδ) between the upper and lower parts of the tube measures the heterogeneity or uniformity of the modified asphalt system. This measurement is expressed as the difference in loss angle δ in degrees, measured at 25° C. and 10 rad/s. The smaller the difference in phase angle, the more homogeneous the compatibilizer/asphalt mixture.

The properties measured for each of the 15 modified asphalts (MA1-MA15) produced are shown in Table 18a and 18b.

noticeably higher softening temperature, lower penetration, and a lower percentage of separation compared to the asphalt modified with the control.

A comparison of the fluorescent microscopy images for MA10 and MA13 revealed that the polymer particles in MA10 were smaller than those in MA13, where the phase morphology shows particles with an average diameter of up to 45 μm. In MA10, the particles are no larger than 20 μm. This reduction in particle size is evidence of greater compatibility with the asphalt, in agreement with the findings of L. H. Lewandoski (1994), Rubber Chemistry and Technology, Rubber Reviews, Vol. 67, No. 3, pp. 447-480.

This evidence of greater compatibility in the modified asphalts containing the polymer blends of the present invention was confirmed by examination of the fluorescent microscopy of MA1, MA4 and MA7, which showed smaller polymer-rich particles dispersed in the asphalt, as well as a TABLE 18a Modified Asphalts

| | Polymer Blend | | | | | | | | |
|---|---|---|---|---|---|---|---|---|---|
| | PB1 | | | PB2 | | | PB3 | | |
| | Modified Asphalt | | | | | | | | |
| | MA1 | MA2 | MA3 | MA4 | MA5 | MA6 | MA7 | MA8 | MA9 |
| Composition (wt. %) | 3.5 | 7 | 11 | 3.5 | 7 | 11 | 3.5 | 7 | 11 |
| RBSP (° C.) | 55 | 61 | 64 | 60 | 58 | 63 | 62 | 64 | 61 |
| Penetration (mm/10) | 51 | 61 | 70 | 42 | 80 | 80 | 44 | 57 | 80 |
| Upper temperature limit (° C.) | 82 | 92 | 104 | 86 | 88 | 101 | 86 | 89 | 100 |
| ISR (Rheology Separation Index) | 1.00 | 1.92 | 1.52 | 0.15 | 1.96 | 2.26 | 0.32 | — | 1.96 |
| Separation using ΔRBSP (%) | 0 | 12.9 | 8.5 | — | 18.9 | 20.0 | 3.4 | 12.5 | 20.0 |

TABLE 18b

Modified Asphalts (Continued)

| | Polymer Blend | | | | | |
|---|---|---|---|---|---|---|
| | PB1 | | | | Control | |
| | Modified Asphalt | | | | | |
| | MA10 | MA11 | MA12 | MA13 | MA14 | MA15 |
| Composition (wt. %) | 3.5 | 7 | 11 | 3.5 | 7 | 11 |
| RBSP (° C.) | 62 | 58 | 63 | 52 | 64 | 64 |
| Penetration (mm/10) | 35 | 75 | 75 | 55 | 52 | 70 |
| Upper temperature limit (° C.) | 87 | 92 | 104 | 81 | 92 | 106 |
| ISR (Rheology Separation Index) | 0.05 | 2.06 | 2.01 | 1.30 | 1.81 | 2.24 |
| Separation using ΔRBSP (%) | 1.5 | 23.1 | 21.6 | 4.9 | | |

Fluorescence microscopy images were obtained of modified asphalts MA1, MA4, MA7, MA10, and MA13, 6, 9, 12, 15, and 18, using an Olympus optical microscope with a fluorescent source and a 380-480 nm filter to observe the morphology of the asphalt/compatibilizer compositions. Micrographs were taken at a magnification of 100×.

Reviewing Tables 18a and 18b, we can see a marked difference between the values of the properties measured for the MA10 asphalt and for the control-modified asphalt, MA13. Specifically, the asphalt modified with MA10 demonstrates a reduction in the percentage of separation in asphalts modified with these polymer blends. This behavior is also observed at higher concentrations of polymer in asphalt. For example, when 11% was used in the production of MA2, an improvement in the temperature of softening and penetration was seen, as well as improved compatibility (Table 18a).

As will be understood by one skilled in the art, for any and all purposes, particularly in terms of providing a written description, all ranges disclosed herein also encompass any and all possible sub-ranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art, all language such as "up to," "at least," "greater than," "less than," and the like, include the number recited and refer to ranges which can be subsequently broken down into subranges as discussed above. It should be understood that the invention is not confined to the particular formulations illustrated and described, but embraces all such modified forms thereof as come within the scope of the following claims.

The invention claimed is:

1. An oligomer-modified anionically polymerized polymer comprising the reaction product of:
    (a) a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 1000 to about 5000 g/mol and a weight average molecular weight of about 1500 to about 18,000 g/mol; a number average number of functional groups from about 4 to about 12; and a polydispersity index of about 1.5 to about 4.5 and
    (b) an anionically polymerized polymer;
    wherein the number average number of functional groups is calculated based upon functional groups selected from the group consisting of epoxy functional groups, anhydride functional groups, and carboxylic acid functional groups.

2. The oligomer-modified anionically polymerized polymer of claim 1, wherein the oligomer has a solubility parameter from about 13 to 30.

3. The oligomer-modified anionically polymerized polymer of claim 1, wherein the anionically polymerized polymer comprises a polymer selected from the group consisting of polystyrene, polybutadiene, polyisoprene, and random, block or tapered copolymers made from monomers selected from the group consisting of styrene, butadiene, and isoprene.

4. The oligomer-modified anionically polymerized polymer of claim 1, wherein the anionically polymerized polymer has a number average molecular weight of about 3,000 to 300,000 g/mol.

5. The oligomer-modified anionically polymerized polymer of claim 1, wherein the anionically polymerized polymer has a number average molecular weight of about 20,000 to 300,000 g/mol.

6. The oligomer-modified anionically polymerized polymer of claim 1, wherein the anionically polymerized polymer is polymerized from at least one vinyl aromatic monomer and at least one conjugated diene molecule.

7. The oligomer-modified anionically polymerized polymer of claim 1, wherein the anionically polymerized polymer is polymerized from vinyl aromatic monomers and conjugated diene monomers in a molar ratio of vinyl aromatic monomer to conjugated diene monomer of about 0.1 to about 1.0.

8. The oligomer-modified anionically polymerized polymer of claim 1, wherein the anionically polymerized polymer is polymerized from conjugated diene monomers and has a content of 1,2-structures from about 8 to 70 mole %.

9. The oligomer-modified anionically polymerized polymer of claim 1, wherein the oligomer-modified anionically polymerized polymer has a percentage of coupled chains from about 2 to 90 mole %.

10. The oligomer-modified anionically polymerized polymer of claim 1, wherein the oligomer-modified anionically polymerized polymer has a number average molecular weight from about 5,000 to 1,000,000 g/mol.

11. The oligomer-modified anionically polymerized polymer of claim 1, wherein the oligomer is polymerized from vinyl aromatic and epoxy functional monomers.

12. The oligomer-modified anionically polymerized polymer of claim 1, wherein the reaction product comprises about 0.1 to 40 wt. % oligomer based on the total amount of reacted oligomer and anionically polymerized polymer.

13. The oligomer-modified anionically polymerized polymer of claim 12, wherein the anionically polymerized polymer is a thermoplastic having a number average molecular weight of about 3,000 to 50,000 g/mol.

14. The oligomer-modified anionically polymerized polymer of claim 13, wherein the oligomer is polymerized from about 1 to 60 mole % epoxy-functional or carboxylic acid-functional monomers.

15. The oligomer-modified anionically polymerized polymer of claim 1, wherein the reaction product comprises about 0.1 to 5 wt. % oligomer based on the total amount of reacted oligomer and anionically polymerized polymer.

16. The oligomer-modified anionically polymerized polymer of claim 15, wherein the anionically polymerized polymer is a thermoplastic polymer having a number average molecular weight of about 20,000 to 100,000 g/mol.

17. The oligomer-modified anionically polymerized polymer of claim 16, wherein the anionically polymerized polymer comprises a polymer selected from the group consisting of polystyrene, polybutadiene, polyisoprene, and random, block or tapered copolymers made from monomers selected from the group consisting of styrene, butadiene, and isoprene.

18. The oligomer-modified anionically polymerized polymer of claim 15, wherein the oligomer is polymerized from about 0.5 to 60 mole % epoxy-functional or carboxylic acid-functional monomers.

19. The oligomer-modified anionically polymerized polymer of claim 12, wherein the anionically polymerized polymer is a thermoplastic having a number average molecular weight of about 5,000 to 40,000 g/mol.

20. A method for preparing an oligomer-modified anionically polymerized polymer, the method comprising reacting an anionically polymerized polymer with a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 1000 to about 5,000 g/mol and a weight average molecular weight of about 1500 to about 18,000 g/mol; a number average number of functional groups from about 4 to about 12; and a polydispersity index of about 1.5 to about 4.5;
    wherein the number average number of functional groups is calculated based upon functional groups selected from the group consisting of epoxy functional groups, anhydride functional groups, and carboxylic acid functional groups.

21. The method of claim 20, wherein the oligomer is polymerized in a reactor using a continuous polymerization process at a polymerization temperature of from about 180 degree C. to about 350 degree C. with a residence time in the reactor of less than about 60 minutes.

22. The method of claim 20, wherein the oligomer is reacted with the anionically polymerized polymer in the same reaction zone where the anionically polymerized polymer is polymerized.

23. The method of claim 20, wherein the anionically polymerized polymer is polymerized in a first reaction zone and reacted with the oligomer in a second reaction zone.

24. The method of claim 20 comprising polymerizing the anionically polymerized polymer, adding a sufficient amount of terminating agent to deactivate a portion of the living chains in the anionically polymerized polymer and reacting at least some of the remaining living chains with the oligomer.

25. The method of claim 20, wherein the molar ratio of oligomer to anionically polymerized polymer in the reaction is between 0.02 and 1.

26. The method of claim 20, wherein reacting the anionically polymerized polymer with the oligomer comprises coupling anionically polymerized polymer with the oligomer and further wherein the average number of anionically polymerized polymer chains reacted with an oligomer is about 2 to 30.

27. The method of claim 26, wherein about 2 to about 90 mole % of the anionically polymerized polymer undergoes coupling reactions.

28. The method of claim 20, wherein reacting the anionically polymerized polymer with the oligomer comprises endcapping anionically polymerized polymer with oligomer and further wherein at least 10 mole % of the anionically polymerized polymer undergoes end-capping reactions.

29. A polymer composition comprising: (a) the oligomer-modified anionically polymerized polymer of claim 1; and (b) a linear anionically polymerized polymer.

30. The polymer composition of claim 29, wherein the linear anionically polymerized polymer comprises a portion of the anionically polymerized polymer that has been deactivated by a terminating agent.

31. The polymer composition of claim 30, wherein the linear anionically polymerized polymer makes up about 10 to 90 mole % of the polymer composition.

32. A reinforced material comprising the oligomer-modified anionically polymerized polymer of claim 1 mixed with a material to be reinforced.

33. The reinforced material of claim 32, wherein the material to be reinforced is selected from the group consisting of asphalt, plastics and rubbers.

34. The reinforced material of claim 32, wherein the reinforced material is a plastic selected from the group consisting of polyamides, polyurethanes, polyethers, polysulfones, polyether-ketones, polyetherether ketones, polyimides, polyetherimides, polycarbonates, polyesters, polystyrene and copolymers thereof.

35. An article made from the reinforced material of claim 32.

36. The article of claim 35, wherein the article is an extruded article, an injection molded article, a compression molded article or a tire.

37. A modified asphalt comprising asphalt mixed with the oligomer-modified anionically polymerized polymer of claim 1.

38. The modified asphalt of claim 37 comprising about 1 to 15 wt. % of the oligomer-modified anionically polymerized polymer based on the total weight of the asphalt and the oligomer-modified anionically polymerized polymer.

39. The modified asphalt of claim 37 comprising about 5 to 20 wt. % of the oligomer-modified anionically polymerized polymer based on the total weight of the asphalt and the oligomer-modified anionically polymerized polymer.

40. A modified asphalt comprising asphalt mixed with the polymer composition of claim 29.

41. The modified asphalt of claim 40 comprising about 1 to 20 wt. % of the polymer composition based on the total weight of the asphalt and the polymer composition.

42. An adhesive composition comprising the oligomer-modified anionically polymerized polymer of claim 1, wherein the reaction product comprises about 0.05 to 5 wt. % oligomer based on the total amount of reacted oligomer and anionically polymerized polymer.

43. The adhesive composition of claim 42, wherein the oligomer is polymerized from about 0.5 to 30 mole % epoxy functional monomer.

44. The adhesive composition of claim 42, wherein the oligomer is polymerized from about 10 to 75 mole % vinyl aromatic monomer.

45. The adhesive composition of claim 42 further comprising at least one additive selected from the group consisting of tackifiers, stabilizers, plasticizers and antioxidants.

46. The adhesive composition of claim 42 comprising about 15 to 30 wt. % oligomer-modified anionically polymerized polymer, about 45 to 60 wt. % tackifier, about 15 to 30 wt. % plasticizer and about 0.05 to 2 wt. % antioxidant.

47. A modified plastic comprising a plastic mixed with the oligomer-modified anionically polymerized polymer of claim 1, the mixture comprising about 1 to 15 wt. % oligomer-modified anionically polymerized polymer based on the total weight of the oligomer-modified anionically polymerized polymer and the plastic.

48. The modified plastic of claim 47, wherein the plastic comprises a polymer selected from the group consisting of polystyrene, polybutadiene, polyisoprene, and random, block or tapered copolymers made from monomers selected from the group consisting of styrene, butadiene, and isoprene and having a number average molecular weight of about 3,000 to 300,000 g/mol.

49. The modified plastic of claim 47 wherein the reaction product comprises about 0.1 to 33 wt. % oligomer based on the total amount of reactor oligomer and anionically polymerized polymer.

50. The modified plastic of claim 49, wherein the oligomer comprises about 0.5 to 50 mole % epoxy-functional, anhydride-functional or carboxylic acid-functional monomer.

51. The modified plastic of claim 47, wherein the anionically polymerized polymer comprises a polystyrene.

52. The modified plastic of claim 47, wherein the mixture comprises about 1 to 10 wt. % oligomer-modified anionically polymerized polymer based on the total weight of the oligomer-modified anionically polymerized polymer and the plastic.

53. The modified plastic of claim 49, wherein the reaction product comprises about 10 to 30 wt. % oligomer based on the total amount of reacted oligomer and anionically polymerized polymer.

54. The modified plastic of claim 53, wherein the anionically polymerized polymer comprises a polystyrene.

55. The modified plastic of claim 47, wherein the plastic is selected from the group consisting of polyamides, polyurethanes, polyethers, polysulfones, polyether-ketones, polyetherether ketones, polyimides, polyetherimides, polycarbonates, polyesters, polystyrene and copolymers thereof.

56. The modified plastic comprising a plastic mixed with the oligomer-modified anionically polymerized polymer of claim 19, wherein the modified plastic comprises about 1 to 10 wt. % of oligomer-modified anionically polymerized plastic based on the total weight of the plastic and the oligomer-modified anionically polymerized polymer.

57. An oligomer-modified anionically polymerized polymer comprising the reaction product of:
(a) a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 1000 to about 10,000 g/mol and a weight average molecular weight of about 1500 to about 18,000 g/mol; a number average number of functional groups from about 4 to about 12; a polydispersity index of about 1.5 to about 4.5; a solubility parameter from about 13 to 30; and is polymerized from about 0.5 to 60 mole % epoxy-functional or carboxylic acid-functional monomers in a reactor using a continuous polymerization process at a polymerization temperature of from about 180 degree C. to about 350 degree C. with a residence time in the reactor of less than about 60 minutes; and
(b) an anionically polymerized polymer polymerized from vinyl aromatic monomers and conjugated diene monomers in a molar ratio of vinyl aromatic monomer to conjugated diene monomer of about 0.1 to about 1.0; wherein the anionically polymerized polymer is a thermoplastic having a number average molecular weight of about 3,000 to 300,000 g/mol;
wherein the number average number of functional groups is calculated based upon functional groups selected from the group consisting of epoxy functional groups, anhydride functional groups, and carboxylic acid functional groups.

58. A reinforced material comprising a compound that is one of asphalt, plastics and rubbers and the reaction product of
(a) a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 500 to about 10,000 g/mol and a weight average molecular weight of about 1000 to about 60,000 g/mol; and is made in a reactor using a continuous polymerization process at a polymerization temperature of from about 180 degree C. to about 350 degree C. with a residence time in the reactor of less than about 60 minutes; and
(b) an anionically polymerized polymer.

59. An article comprising the reinforced material of claim 58.

60. The article of claim 59, wherein the article is an extruded article, an injection molded article, a compression molded article or a tire.

61. A modified asphalt comprising asphalt and the reaction product of
(a) a free-radically polymerized oligomer obtained from reaction of at least one monomer selected from the group consisting of vinyl aromatic monomers and ester functional monomers and at least one monomer selected from the group consisting of epoxy functional monomers, anhydride functional monomers, ester functional monomers and carboxylic acid functional monomers, the oligomer having a number average molecular weight of about 500 to about 10,000 g/mol and a weight average molecular weight of about 1000 to about 60,000 g/mol; and is made in a reactor using a continuous polymerization process at a polymerization temperature of from about 180 degree C. to about 350 degree C. with a residence time in the reactor of less than about 60 minutes; and
(b) an anionically polymerized polymer.

62. The modified asphalt of claim 61 comprising about 1 to 20 wt. % of the oligomer-modified anionically polymerized polymer based on the total weight of the asphalt and the oligomer-modified anionically polymerized polymer.

63. A composition comprising an adhesive composition including the reaction product of
(a) a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 500 to about 10,000 g/mol and a weight average molecular weight of about 1000 to about 60,000 g/mol; and is made in a reactor using a continuous polymerization process at a polymerization temperature of from about 180 degree C. to about 350 degree C. with a residence time in the reactor of less than about 60 minutes; and
(b) an anionically polymerized polymer;
wherein the reaction product comprises about 0.05 to 5 wt. % oligomer based on the total amount of reacted oligomer and anionically polymerized polymer and
(c) at least one additive selected from the group consisting of tackifiers, stabilizers, plasticizers and antioxidants;
wherein the oligomer has a number average number of functional groups from about 4 to about 12 and a polydispersity index of about 1.5 to about 4.5, and the number average number of functional groups is calculated based upon functional groups selected from the group consisting of epoxy functional groups, anhydride functional groups, and carboxylic acid functional groups.

64. The adhesive composition of claim 63, wherein the oligomer is polymerized from about 0.5 to 30 mole % epoxy functional monomer.

65. The adhesive composition of claim 63, wherein the oligomer is polymerized from about 10 to 75 mole % vinyl aromatic monomer.

66. A modified plastic comprising a plastic mixed with the reaction product of
(a) a free-radically polymerized oligomer consisting of the reaction product of one or more monomers selected from the group consisting of vinyl aromatic monomers and ester functional monomers and one or more monomers selected from the group consisting of epoxy functional monomers, anhydride functional monomers, ester functional monomers and carboxylic acid functional monomers, the oligomer having a number average molecular weight of about 500 to about 10,000 g/mol and a weight average molecular weight of about 1000 to about 60,000 g/mol; and is made in a reactor using a continuous polymerization process at a polymerization temperature of from about 180 degree C. to about 350 degree C. with a residence time in the reactor of less than about 60 minutes; and (b) an anionically polymerized polymer;

wherein the mixture comprising of about 1 to 15 wt. % oligomer-modified anionically polymerized polymer based on the total weight of the oligomer-modified anionically polymerized polymer and the plastic.

67. The modified plastic of claim 66 wherein the reaction product comprises about 0.1 to 33 wt. % oligomer based on the total amount of reactor oligomer and anionically polymerized polymer.

68. The modified plastic of claim 67, wherein the oligomer comprises about 0.5 to 50 mole % epoxy-functional, anhydride-functional or carboxylic acid-functional monomer.

69. The modified plastic of claim 66, wherein the anionically polymerized polymer comprises a polystyrene.

70. The modified plastic of claim 66, wherein the plastic is selected from the group consisting of polyamides, polyurethanes, polyethers, polysulfones, polyether-ketones, polyether ether ketones, polyimides, polyetherimides, polycarbonates, polyesters, polystyrene and copolymers thereof 71. The reinforced material of claim 58, wherein the oligomer has a number average number of functional groups from about 4 to about 12 and a polydispersity index of about 1.5 to about 4.5, and the number average number of functional groups is calculated based upon functional groups selected from the group consisting of epoxy functional groups, anhydride functional groups, and carboxylic acid functional groups.

72. The modified asphalt of claim 61, wherein the oligomer has a number average number of functional groups from about 4 to about 12 and a polydispersity index of about 1.5 to about 4.5, and the number average number of functional groups is calculated based upon functional groups selected from the group consisting of epoxy functional groups, anhydride functional groups, and carboxylic acid functional groups.

73. The modified plastic of claim 66, wherein the oligomer has a number average number of functional groups from about 4 to about 12 and a polydispersity index of about 1.5 to about 4.5, and the number average number of functional groups is calculated based upon functional groups selected from the group consisting of epoxy functional groups, anhydride functional groups, and carboxylic acid functional groups.

* * * * *

UNITED STATES PATENT AND TRADEMARK OFFICE
CERTIFICATE OF CORRECTION

PATENT NO. : 7,517,934 B2 Page 1 of 1
APPLICATION NO. : 10/710654
DATED : April 14, 2009
INVENTOR(S) : Deeter et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 64 days Delete the phrase "by 64 days" and insert -- by 92 days --

Signed and Sealed this

Twenty-seventh Day of April, 2010

David J. Kappos
*Director of the United States Patent and Trademark Office*